United States Patent
Wang

(10) Patent No.: US 10,710,711 B2
(45) Date of Patent: Jul. 14, 2020

(54) SYSTEMS AND METHODS FOR UAV SENSOR PLACEMENT

(71) Applicant: SZ DJI TECHNOLOGY CO., LTD., Shenzhen, Guangdong (CN)

(72) Inventor: Mingyu Wang, Guangdong (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/038,955

(22) Filed: Jul. 18, 2018

(65) Prior Publication Data
US 2018/0339768 A1    Nov. 29, 2018

Related U.S. Application Data

(63) Continuation of application No. PCT/CN2016/099582, filed on Sep. 21, 2016.

(51) Int. Cl.
*B64C 27/20* (2006.01)
*G05D 1/10* (2006.01)
(Continued)

(52) U.S. Cl.
CPC ............ *B64C 27/20* (2013.01); *B64C 39/024* (2013.01); *B64D 47/08* (2013.01); *G05D 1/101* (2013.01);
(Continued)

(58) Field of Classification Search
CPC ....... B64C 27/20; B64C 19/00; B64C 39/024; B64D 47/08
See application file for complete search history.

(56) References Cited

U.S. PATENT DOCUMENTS

| 6,367,736 B1 | 4/2002 | Pancotti |
| 7,032,861 B2* | 4/2006 | Sanders, Jr. ............ B64C 27/12 |
| | | 244/12.1 |

(Continued)

FOREIGN PATENT DOCUMENTS

| CN | 103318405 A | 9/2013 |
| CN | 204452931 U | 7/2015 |

(Continued)

OTHER PUBLICATIONS

International Search Report and Written Opinion issued in corresponding International Application No. PCT/CN2016/099582 dated Jun. 26, 2017.

(Continued)

*Primary Examiner* — Timothy D Collins
*Assistant Examiner* — Keith L Dixon
(74) *Attorney, Agent, or Firm* — Robert E. Colletti; Haug Partners LLP

(57) ABSTRACT

An unmanned aerial vehicle (UAV) (200, 300, 400, 700, 800, 1000, 1200, 1500) can include a central body (202, 302, 402, 702, 802, 1002, 1202, 1502), a plurality of rotors, and a plurality of arms (204, 306, 406, 706, 806, 1006, 1206, 1506) extending from the central body (202, 302, 402, 702, 802, 1002, 1202, 1502), where each arm of the plurality of arms (204, 306, 406, 706, 806, 1006, 1206, 1506) is configured to support one or more of the plurality of rotors. The UAV may include at least one sensor (208, 318, 418, 718, 818, 822, 1022, 1218, 1222, 1518) located on the UAV (200, 300, 400, 700, 800, 1000, 1200, 1500) outside of a keep-out zone, where the keep-out zone is defined at least in part by (1) a plurality of rotor disks, a rotor disk of the plurality of rotor disks for each of the plurality of rotors, each rotor disk corresponding to an area that is swept by one or more rotor blades (206, 308, 408, 708, 808, 1008, 1208, 1508) of a (Continued)

corresponding rotor when the rotor blades (206, 308, 408, 708, 808, 1008, 1208, 1508) are spun, and (2) a shape that is formed by adjoining respective centers of adjacent rotor disks.

29 Claims, 20 Drawing Sheets

(51) Int. Cl.
*B64C 39/02* (2006.01)
*B64D 47/08* (2006.01)
(52) U.S. Cl.
CPC .. *B64C 2201/123* (2013.01); *B64C 2201/127* (2013.01); *B64C 2201/145* (2013.01)

(56) References Cited

U.S. PATENT DOCUMENTS

| | | | | |
|---|---|---|---|---|
| 9,004,973 | B2* | 4/2015 | Condon | A63H 13/00 446/37 |
| 9,677,564 | B1* | 6/2017 | Woodworth | B64C 39/024 |
| 9,834,306 | B2* | 12/2017 | Almasoud | B64C 39/024 |
| 9,927,682 | B2* | 3/2018 | Fisher | G03B 15/006 |
| 10,160,541 | B1* | 12/2018 | Beckman | B64C 39/024 |
| 10,198,011 | B2* | 2/2019 | DeBitetto | G05D 1/101 |
| 2015/0321755 | A1 | 11/2015 | Martin et al. | |
| 2016/0185454 | A1 | 6/2016 | Hutson | |
| 2016/0304193 | A1* | 10/2016 | Marcel | B64C 27/08 |
| 2017/0341776 | A1 | 11/2017 | McClure et al. | |

FOREIGN PATENT DOCUMENTS

| | | |
|---|---|---|
| CN | 105564644 A | 5/2016 |
| CN | 105667773 A | 6/2016 |
| CN | 205311894 U | 6/2016 |
| CN | 105775118 A | 7/2016 |
| CN | 105 857 590 A | 8/2016 |
| CN | 105857593 A | 8/2016 |
| CN | 105891908 A | 8/2016 |
| CN | 105905286 A | 8/2016 |
| CN | 205469809 U | 8/2016 |
| CN | 205554567 U | 9/2016 |
| CN | 205554617 U | 9/2016 |
| CN | 206141826 U | 5/2017 |
| DE | 10 2011 119 590 A1 | 5/2013 |
| KR | 2012 0102880 A | 9/2012 |
| WO | WO 2014/108459 | 7/2014 |
| WO | WO 2016/149545 A1 | 9/2016 |

OTHER PUBLICATIONS

Office Action issued in corresponding Chinese Application No. 201680004302.3 dated Sep. 14, 2018.
Supplementary European Search Report issued in corresponding European Application No. 16916452.2 dated Jul. 29, 2019.
International Search Report issued in the corresponding International Application No. PCT/CN2016/099600.

* cited by examiner

SYSTEMS AND METHODS FOR UAV SENSOR PLACEMENT

BACKGROUND OF THE INVENTION

An unmanned vehicle such as an unmanned aerial vehicle (UAV) can be used for various applications, such as performing surveillance, reconnaissance, and exploration tasks in a wide variety of environments for military and civilian applications. A UAV may also be used in various delivery applications, including delivery of chemicals to crops in agriculture. A UAV may comprise one or more sensors for collecting information regarding its environment and the UAV may employ such information for obstacle avoidance. The ability of a UAV to avoid obstacles during flight may be advantageous, for example to both prevent damage to the UAV and facilitate completion of its tasks.

SUMMARY OF THE INVENTION

The ability of a UAV to avoid obstacles in its surrounding environment may depend in part on the quality of information collected by one or more sensors positioned on the UAV regarding the environment surround the UAV. Interference from one or more components of the UAV and/or as a result of operation of the UAV may degrade the quality of information collected by the one or more sensors. According to some aspects, an unmanned aerial vehicle (UAV) is provided. The UAV may demonstrate improved obstacle avoidance capabilities, such as due to an improvement in the quality of information provided by one or more sensors on the UAV. The UAV may comprise a central body, a plurality of rotors, a plurality of arms extending from the central body, wherein each arm of the plurality of arms is configured to support one or more of the plurality of rotors. The UAV may comprise at least one sensor located on the UAV outside of a keep-out zone, wherein the keep-out zone is defined at least in part by (1) at least a portion of a plurality of rotor disks, a rotor disk of the plurality of rotor disks for each of the plurality of rotors, each rotor disk corresponding to an area that is swept by one or more rotor blades of a corresponding rotor when the rotor blades are spun, and (2) a shape that is formed by adjoining respective vertical center axes of adjacent rotor disks.

In some embodiments, the at least one sensor is configured to sense an environment in which the UAV is configured to operate, by detecting one or more obstacles within the environment.

In some embodiments, the at least one sensor comprises at least one of a proximity sensor, an image sensor, and a global positioning system (GPS) sensor.

In some embodiments, the at least one sensor is configured to measure at least one of acoustic wave signals, and electromagnetic wave signals from the environment. In some embodiments, the electromagnetic wave signals comprise at least one of radio waves, microwaves, infrared waves, visible light waves, ultraviolet waves, X-ray waves, and gamma ray waves.

In some embodiments, at least a portion of at least two of the plurality of rotor disks lie on a same plane. In some embodiments, at least a portion of at least two of the plurality of rotor disks lie on different planes.

In some embodiments, the at least one sensor is located further away from the central body than the one or more rotor disks on each of the plurality of arms. In some embodiments, each of the plurality of rotor disks comprises an outer portion and an inner portion opposite the outer portion, the outer portion being further away from the central body than the inner portion, and wherein the keep-out zone is defined at least in part by the outer portion of each of the plurality of rotor disks. In some embodiments, the at least one sensor is located outside of the keep-out zone and is facing away from the central body, the keep-out zone being defined at least in part by the outer portion of the rotor disk.

In some embodiments, the shape formed by adjoining respective vertical center axes of adjacent rotor disks is a regular shape. In some embodiments, the shape formed by adjoining respective vertical center axes of adjacent rotor disks is an irregular shape.

In some embodiments, the at least one sensor is located on a distal end of a corresponding one of the plurality of arms.

In some embodiments, the at least one sensor is located on a component of the UAV, and wherein the component is selected from a group consisting of a protective cover and a landing stand. In some embodiments, the at least one sensor is on an outer surface of the protective cover facing away from the central body.

In some embodiments, the protective cover is attached to the central body of the UAV. In some embodiments, the protective cover is attached to a distal end of an arm. In some embodiments, the protective cover is configured to surround the central body, the plurality of arms, and the plurality of rotors of the UAV. In some embodiments, the protective cover is configured to protect the UAV from external impact. In some embodiments, the protective cover is configured to protect at least one of the plurality of rotors from external impact. In some embodiments, the protective cover comprises a portion which is further away from the central body than the one or more rotor disks on a corresponding arm. In some embodiments, the protective cover is positioned adjacent to and partially surrounds the at least one of the plurality of rotor disks.

In some embodiments, the UAV may further comprise a landing stand operably coupled to at least one of the central body and an arm of the UAV, wherein the at least one sensor is attached to the landing stand. In some embodiments, the landing stand is rigidly attached to a distal end of the arm. In some embodiments, the landing stand is located further away from the central body than one or more rotor disks of the one or more rotors on a corresponding arm. In some embodiments, the landing stand extends downward from a distal end of the corresponding arm.

In some embodiments, the landing stand is rotatably coupled to the central body. In some embodiments, the landing stand is configured to be rotatable towards the central body to extend laterally from the central body when the UAV is in a flight configuration, wherein the at least one sensor is located on a portion of the landing stand outside the keep-out zone when the UAV is in the flight configuration. In some embodiments, the landing stand is configured to be rotatable away from the central body to extend below the central body when the UAV is in a landing configuration, wherein the at least one sensor is located on a portion of the landing stand within the keep-out zone when the UAV is in the landing configuration.

In some embodiments, the component is integrally formed with at least one of the plurality of arms, and the central body.

In some embodiments, the component is operably coupled to at least one of the plurality of arms, and the central body. In some embodiments, a coupling between the component and the at least one of the plurality arms and the central body comprises at least one of a mechanical coupling and an electrical coupling. In some embodiments, the component comprises a plurality of parts configured to be assembled onto the central body.

In some embodiments, the at least one sensor is located on one or more of the plurality of arms, and wherein at least one of the plurality of arms comprises a hollow cavity that allows electrical wiring to pass through from the central body to the at least one sensor. In some embodiments, electrical wiring is (1) routed from the central body through a hollow cavity of an arm, (2) exits the hollow cavity at a distal end of an arm, and (3) wraps around an outer portion of the component to connect to the at least one sensor. In some embodiments, electrical wiring is (1) routed from the central body and (2) wraps around an outer portion of the component and an arm to connect to the at least one sensor.

In some embodiments, the component comprises a hollow cavity that allows electrical wiring to pass through from the central body to the at least one sensor. In some embodiments, the component and an arm each comprises a hollow cavity that allows the electrical wiring to pass through from the central body to the at least one sensor.

In some embodiments, electrical wiring connects the at least one sensor to one or more processors in the central body. In some embodiments, the one or more processors are located in a flight controller and/or inertial measurement unit (IMU) of the UAV.

In some embodiments, the arm and/or central body comprises a first connector having a first set of electrical wiring, and wherein the component comprises a second connector having a second set of electrical wiring.

According to some aspects, a method of assembling an unmanned aerial vehicle (UAV) is provided. The method of assembling may comprise attaching to a central body of the UAV to a plurality of arms that extend from the central body, wherein each arm of the plurality of arms is configured to support one or more rotors, and attaching to the UAV at least one sensor outside of a keep-out zone, wherein the keep-out zone is defined at least in part by (1) a rotor disk of each rotor, and (2) a shape that is formed by adjoining respective vertical center axes of adjacent rotor disks.

In some embodiments, the method may further comprise attaching the at least one sensor to a distal end of a corresponding one of the plurality of arms.

In some embodiments, the method may further comprise attaching to the UAV at least one of a protective cover and a landing stand, wherein attaching to the UAV at least one sensor comprises attaching the at least one sensor to a portion of the protective cover or the landing stand outside of the keep-out zone. In some embodiments, the method may further comprise attaching the at least one sensor to an outer surface of the protective cover facing away from the central body.

In some embodiments, the method may further comprise attaching the at least one sensor to the UAV at a location further away from the central body than the one or more rotor disks on each of the plurality of arms.

According to some aspects, a kit is provided. The kit may comprise at least one sensor that is configured to be attached to an unmanned aerial vehicle (UAV), wherein the UAV comprises a central body and a plurality of arms extending from the central body, and wherein each arm of the plurality of arms is configured to support one or more rotors; and instructions for assembling the UAV. When the UAV is assembled according to the instructions, the assembled UAV may be characterized in that: the at least one sensor is located on the UAV outside of a keep-out zone, wherein the keep-out zone is defined by (1) a rotor disk of each rotor, or (2) a shape that is formed by adjoining respective vertical center axes of adjacent rotor disks.

In some embodiments, the kit may further comprise a protective cover and a landing stand, wherein the assembled UAV is characterized in that the at least one sensor is on a portion of the protective cover or the landing stand outside of the keep-out zone. In some embodiments, the landing stand is configured to be rotatably coupled to the central body, the landing stand being configured to be rotatable towards the central body to extend laterally from the central body when the UAV is in a flight configuration, wherein the at least one sensor is located on a portion of the landing stand outside the keep-out zone when the UAV is in the flight configuration In some embodiments, the assembled UAV is characterized in that the at least one sensor is located on a distal end of an arm. In some embodiments, the at least one sensor comprises at least one of a proximity sensor, an image sensor, and a global positioning system (GPS) sensor.

According to some aspects, a method of environmental sensing using an unmanned aerial vehicle (UAV) may comprise providing at least one sensor configured to collect environmental information; and attaching the at least one sensor to the UAV outside of a keep-out zone, the UAV comprising a plurality of rotors, wherein the keep-out zone is defined at least in part by (1) a plurality of rotor disks for each of the plurality of rotors, and (2) a shape that is formed by adjoining respective vertical center axes of adjacent rotor disks. The at least one sensor may be attached outside of the keep-out zone to reduce visual obstruction and/or noise interference during collection of the environmental information.

In some embodiments, the shape formed by adjoining respective vertical center axes of adjacent rotor disks is a regular shape. In some embodiments, the visual obstruction is due to at least one of a location of (i) the plurality of arms, (ii) the one or more rotors, and (iii) the central body of the UAV. In some embodiments, the noise interference is generated by rotation of the plurality of rotors during operation of the UAV.

In some embodiments, the method may further comprise attaching to the UAV at least one of a protective cover and a landing stand, wherein attaching the at least one sensor to the UAV comprises attaching the at least one sensor to a portion of the protective cover or the landing stand outside of the keep-out zone.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
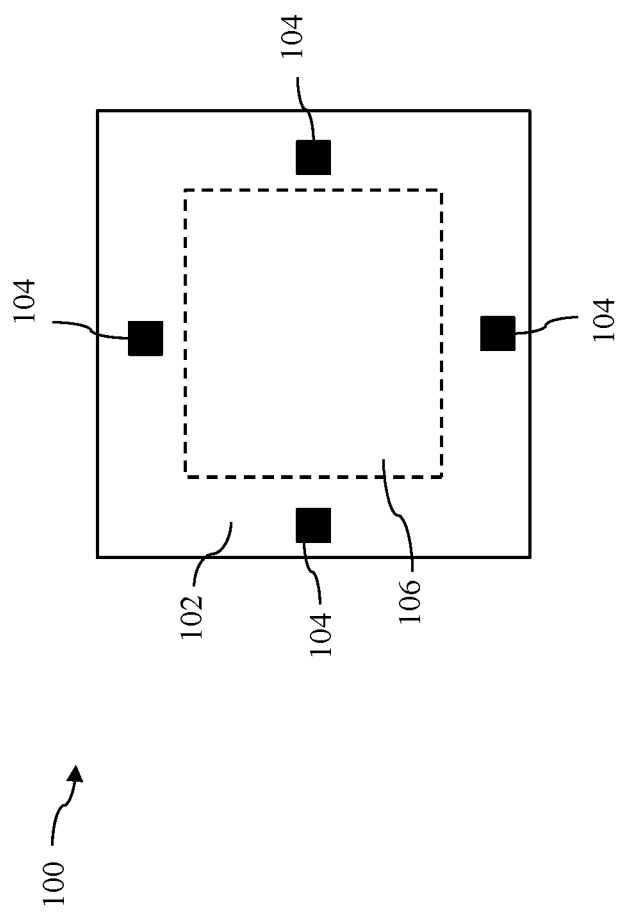
FIG. 1 is a schematic diagram of an example of a UAV.

The present disclosure provides improved systems and methods for collecting information relating to the environment surrounding a UAV. The ability of a UAV to avoid obstacles in its surrounding environment may depend in part on the quality of information collected by one or more sensors positioned on the UAV. Interference from one or more components of the UAV and/or as a result of operation of the UAV may degrade the quality of information collected by the one or more sensors, reducing the accuracy and/or reliability of the information provided by the sensors. For example, measurement of one or more parameters by the sensors may be impeded due to visual obstruction by one or more other components of the UAV and/or by noise interference generated by operation of one or more other components of the UAV. Noise interference may include, for example, electromagnetic interference, and/or distortion due to high pressure air release and/or air flow proximate or adjacent to the sensors. Such degradation in the quality of information collected by the sensors may reduce the obstacle avoidance capability of the UAV.

A UAV comprising one or more sensors positioned on one or more portions of the UAV as described herein may demonstrate improved obstacle avoidance capability during operation of the UAV, such as due to improved accuracy and/or reliability in the information collected by the one or more sensors regarding the physical environment in which the UAV is operating. In some embodiments, a UAV can comprise one or more sensors on one or more portions of the UAV outside of a keep-out zone. The keep-out zone may comprise a space within which undesired interference to measurements made by sensors would occur if the sensors were placed within the space. In some embodiments, the keep-out zone of a UAV may be selected based on the type of sensors. The keep-out zone may be selected such that interference from one or more components of the UAV to the measurements made by the one or more sensors on the UAV can be reduced or eliminated.

In some embodiments, the one or more sensors described herein may comprise at least one sensor configured to collect environmental information. A sensor can be used to detect and/or collect various types of data regarding the environment surrounding the UAV. In some cases, a sensor may experience interference from one or more components of the UAV if positioned within the keep-out zone. For example, a sensor may experience physical interference (such as visual obstruction) from one or more portions of the UAV. A sensor may also experience noise interference (e.g., electromagnetic interference, airflow/motor noise) due to operation of the UAV, which may arise due to operation of one or more sets of rotor blades and/or electronic components of the UAV.

In some embodiments, the sensors may comprise a location sensor (e.g., global positioning system (GPS) sensors), vision sensor (e.g., imaging devices capable of detecting visible, infrared, or ultraviolet light, such as cameras), proximity sensor (e.g., ultrasonic sensors), combinations thereof, and/or the like. In some embodiments, the UAV may comprise two or more types of sensors for collecting information relating to the environment surrounding the UAV. For example, in some instances, the UAV may comprise a two or more sensors selected from the group consisting of GPS sensors, image sensors and ultrasonic sensors. In some embodiments, the UAV may comprise a plurality of sensors positioned on various portions of the UAV outside of the keep-out zone, the plurality of sensors comprising any combination of GPS sensors, image sensors, and ultrasonic sensors.

In some embodiments, other sensors suitable for collecting environmental information useful for obstacle detection may be used. Those other types of sensors may comprise mobile device transmitters enabling location triangulation, a lidar sensor and/or time-of-flight cameras), inertial sensors (e.g., accelerometers, gyroscopes, inertial measurement units (IMUs)), altitude sensors, pressure sensors (e.g., barometers), audio sensors (e.g., microphones) or field sensors (e.g., magnetometers, electromagnetic sensors). In some embodiments, the sensors can include a sensor for detecting acoustic wave signals other than an ultrasonic sensor, or a sensor for measuring electromagnetic waves other than a GPS sensor. In some embodiments, the sensors can be configured to measure radio waves, microwaves, infrared waves, visible light, ultraviolet waves, x-ray waves and/or gamma rays waves.

In some embodiments, one or more sensors may be configured to face outwardly from the UAV. One or more measuring components of the sensors may be configured to face various directions. In some embodiments, at least a portion of the sensors may be configured to rotate along one or more axes to facilitate information collection. In some embodiments, one or more components of a sensor configured for collecting information can change orientation during operation of the sensors.

Measurements made by an ultrasonic sensor may be degraded due to locally generated ultrasonic noise. For example, measurements made by ultrasonic sensors may be distorted due to high pressure air release near the sensors, such as with sensors placed near sources which generate high air flow, including sensors positioned too close to rotor blades of the UAV. Images collected by image sensors may be affected by visual obstruction within the field of view of the image sensors. For example, portions of the UAV may extend into the field of view of image sensors inappropriately positioned on the UAV such that the portions of the UAV may obstruct the view of the image sensors. Measurements made by a GPS sensor positioned too close to various electronic components of the UAV may experience electromagnetic interference from those electronic components.

In some embodiments, a keep-out zone for a UAV can be selected such that undesired interference to measurements made by the sensors placed on the UAV outside of the keep-out zone may be reduced or eliminated, thereby providing improved quality in the information collected by the sensors. Measurements made by sensors attached to portions of the UAV within the keep-out zone may be inaccurate due to visual obstruction by another portion of the UAV and/or due to interference from operation of one or more components of the UAV. A UAV comprising one or more sensors positioned on one or more portions of the UAV outside of a keep-out zone may demonstrate improved obstacle avoidance capabilities. In some embodiments, one or more ultrasonic sensors placed on the UAV outside of the keep-out zone may experience no or reduced interference from locally generated ultrasonic noise. For example, the one or more ultrasonic sensors may be placed at a predetermined distance away from the rotor blades of the UAV such that air flow generated by the spinning rotor blades during flight does not undesirably interfere with measurements made by the ultrasonic sensors. In some embodiments, one or more image sensors may be positioned on the UAV such that parts of the UAV, including one or more arms, landing stands, propulsion units and/or the central body, do not lie in the field of view of the image sensor. As used herein, a propulsion unit can include various components which operate to generate lift for the UAV, such as including a set of rotor blades and a rotor coupled to the set of rotor blades. In some embodiments, one or more ultrasonic or GPS sensors can be placed on the UAV such that the sensors do not experience significant interference from acoustic or electromagnetic noise, respectively. In some embodiments, one or more GPS sensors may be positioned on the UAV such that electromagnetic interference generated by the operation of electronic devices of the UAV are reduced or eliminated. For example, one or more GPS sensors may be positioned at a predetermined distance away from electronic devices housed within the central body of the UAV.

In some embodiments, the keep-out zone may comprise a rotor blades spin space for each set of rotor blades of the UAV. A rotor blades spin space may comprise a rotor disk for a corresponding set of rotor blades. A rotor blades spin space may be a space through which the set of rotor blades are spun. In some embodiments, the keep-out zone may comprise an interference space. In some cases, a rotor blades spin space can be larger than the rotor disk of the corresponding set of rotor blades. In some embodiments, the interference space may comprise a space which encompasses or substantially encompasses the central body of the UAV. In some embodiments, the interference space may comprise a lateral boundary comprising sides which extend between adjacent propulsion units. In some embodiments, the keep-out zone may comprise both a rotor blades spin space for each set of rotor blades of the UAV and an interference space. For example, one or more sensors positioned on the UAV outside of both the rotor blades spin spaces and the interference space may demonstrate improved accuracy in the information collected regarding the environment surrounding the UAV, thereby providing a UAV demonstrating improved ability to avoid obstacles.

The UAVs described herein may be quadcopters comprising a central body. It will be understood that one or more features described herein may be applied to UAVs having other configurations, such as UAV with fewer or more propulsion units, and/or UAVs with a central body comprising more or fewer lateral surfaces.

FIG. 1 is a schematic diagram of a UAV 100. The UAV 100 can have a plurality of sensors 104 positioned on respective portions of the UAV 100. In some embodiments, each of the plurality of sensors 104 may be placed on a portion of the UAV 100 that is outside of a keep-out zone 106. For example, the plurality of sensors 104 may be positioned on portions of the UAV 100 in zone 102. As shown in FIG. 1, zone 102 may comprise portions of the UAV 100 that lie outside of the keep-out zone 106. Placement of the sensors 104 in zone 102 outside of the keep-out zone 106 may reduce or eliminate adverse effects on the sensor measurements by one or more portions of the UAV 100 and/or as a result of the operation of one or more portions of the UAV 100, such that each of the plurality of sensors 104 can provide measurements having desired levels of accuracy.

In some embodiments, the sensors 104 can be configured to collect information regarding the environment surrounding the UAV 100. In some cases, the sensors 104 can be used for obstacle avoidance. For example, the sensors 104 can be configured to measure various parameters for determining the presence of and/or a distance of the UAV 100 from one or more obstacles. The UAV 100 may include an obstacle avoidance system comprising the plurality of sensors 104, where the obstacle avoidance system is configured to receive information collected by the sensors 104 regarding the environment surrounding the UAV 100, and to adjust the movement of the UAV 100 in response to the information so as to avoid the obstacles in the environment around the UAV 100. In some embodiments, the sensors 104 can be configured to collect information regarding the surrounding environment, such that the UAV 100 can detect one or more stationary and/or movable objects in the vicinity of the UAV 100 so as to avoid the one or more obstacles.

Figure 2:
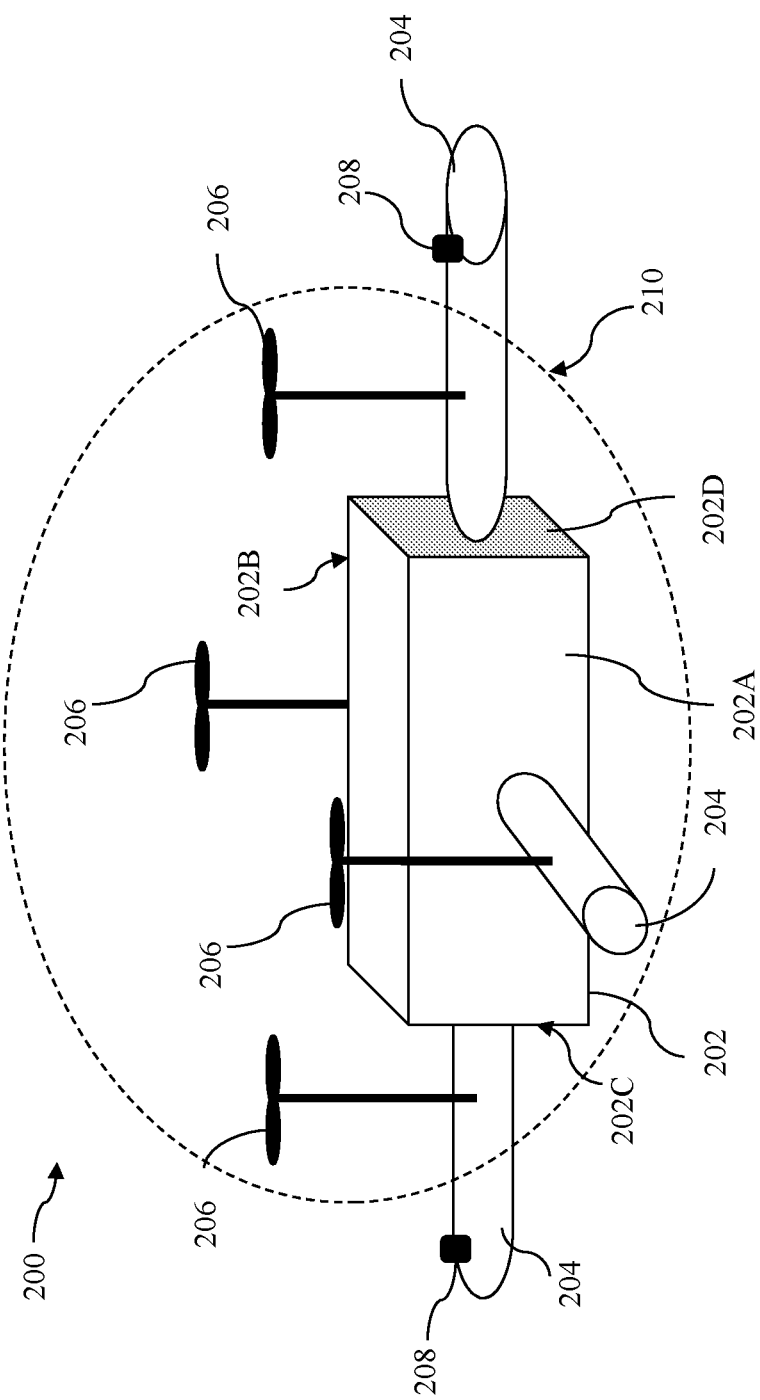
FIG. 2 is a schematic side perspective view of an example of a UAV.

The plurality of sensors 104 may comprise various types of sensors. The plurality of sensors 104 may be the same type of sensors or may comprise different types of sensors. As described herein, the plurality of sensors 104 may comprise one or more types of sensors suitable for collecting information regarding the environment surrounding the UAV 100. In some embodiments, the sensors 104 can comprise image sensors, GPS sensors, ultrasonic sensors, or a combination thereof. In some embodiments, the UAV can include a combination of image sensors, GPS sensors and ultrasonic sensors. FIG. 2 is a schematic diagram of a UAV 200 comprising a central body 202, and a plurality of arms 204 extending outwardly from the central body 202. The central body 202 of the UAV 200 shown in FIG. 2 may have a polyhedron shape having two pairs of opposing side surfaces, 202A, 202B and 202C, 202D. The UAV 200 may include four arms 204, one of the four arms 204 extending outwardly from each of the side surfaces 202A, 202B, 202C and 202D. The UAV 200 can include a plurality of sets of rotor blades 206 configured to provide lift for the UAV 200. As shown, the UAV 200 can have four sets of rotor blades 206, where a set of rotor blades 206 can be coupled to a corresponding arm 204. The pitch, roll, and yaw of the UAV 200 can be adjusted by adjusting the rotational speed and/or directions of one or more of the four sets of rotor blades 206. The UAV 200 can have a plurality of sensors 208. The plurality of sensors 208 can be located outside of a keep-out zone 210. For example, the UAV 200 can include two sensors 208, each on a portion of an arm 204 that is outside of the keep-out zone 210. The keep-out zone 210 is shown having a rounded shape, such as a sphere. The sensors 208 can be positioned on the UAV 200 outside of the keep-out zone 210 such that interference to measurements made by the sensors 208 can be reduced or eliminated, such as interference from one or more portions of the UAV 200 or as a result of operation of one or more portions of the UAV 200.

A keep-out zone can comprise various shapes. In some embodiments, the keep-out zone need not be a sphere. The keep-out zone may be defined by any shape on a 2-dimensional plane or in 3-dimensional space. In some cases, the shape of the keep-out zone may be selected based on a configuration of the UAV and/or the one or more sensors used. For example, the keep-out zone may be selected based on the number and/or types of electronic devices housed within the central body of the UAV, and/or the type of information collected by the sensors. Various configurations of the sensor placement on the UAV may be contemplated. In some embodiments, one or more sensors may be positioned on portions of the UAV outside of the keep-out zone other than on the arms. For example, one or more sensors may be positioned on portions of a landing stand and/or a protective cover of the UAV outside of the keep-out zone.

A central body of a UAV can have various shapes. In some embodiments, the central body may have a shape other than a polyhedron. In some embodiments, the central body can comprise one or more curves. In some embodiments, the central body can comprise a rounded shape. In some embodiments, one or more arms of the UAV may extend from the UAV other than from a lateral surface of the UAV. In some embodiments, an arm can extend from an edge of the UAV. In some embodiments, each of the plurality of the arms may extend from an edge of the UAV.

Figure 3:
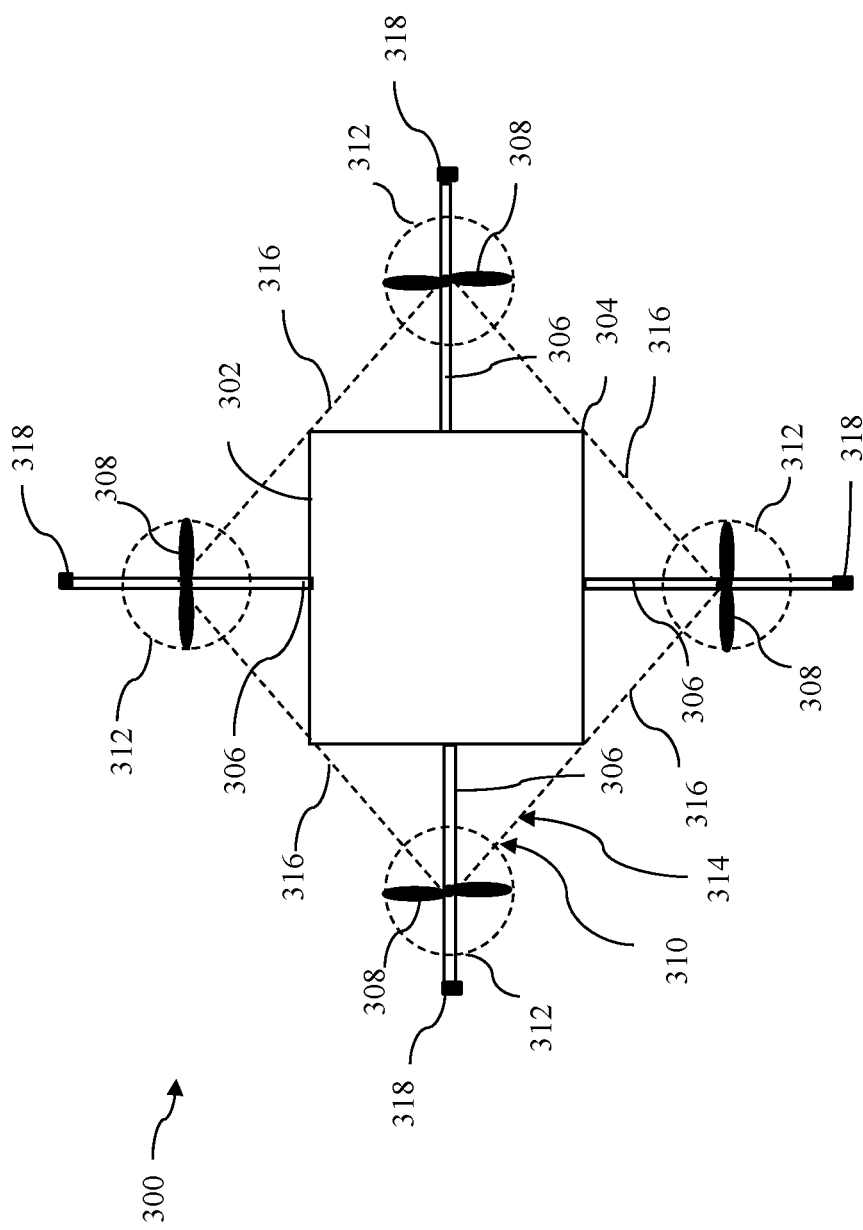
FIG. 3 is a schematic top-down view of an example of a UAV.

FIG. 3 is a top-down schematic view of an example of a UAV 300. The UAV 300 may comprise a central body 302 and a plurality of arms 306 extending outwardly from the central body 302. In some embodiments, the central body 302 can have a quadrilateral shape, adjacent sides of the quadrilateral shape being joined at corresponding connection portions 304. In some embodiments, the adjacent sides of the central body 302 can be perpendicular or substantially perpendicular to one another such that the central body 302 comprises a rectangular shape. In some embodiments, the four sides of the central body 302 can have the same length such that the central body 302 comprises a square. As shown in FIG. 3, the UAV 300 may comprise four arms 306, an arm 306 extending outwardly from each of the four sides of the central body 302. In some embodiments, each arm 306 may be perpendicular or substantially perpendicular to the side of the central body 302 from which it extends.

It will be understood that although the central body of the UAV is described herein primarily as having a quadrilateral shape, the central body of the UAV may have a shape other than a quadrilateral. The central body of the UAV may comprise more or fewer sides. In some embodiments, the central body of the UAV may comprise a shape comprising one or more arcs. In some embodiments, the central body may comprise a rounded shape. In some embodiments, one or more arms of a UAV may extend from a curved edge of the central body.

In some embodiments, the UAV 300 may comprise a plurality of sets of rotor blades 308. Each set of rotor blades 308 may be coupled to a corresponding arm 306. For example, the UAV 300 may comprise one set of rotor blades 308 coupled to each of the four arms 306 such that the UAV 300 is a quadcopter. In some embodiments, UAV 300 comprises a rotor for each of the sets of rotor blades 308, each of the sets of rotor blades 308 coupled to a corresponding rotor. For example, a rotor may be on each of the plurality of arms 306 for coupling to a set of rotor blades 308.

In some embodiments, one or more arms of a UAV may comprise more than one rotor such that more than one set of rotor blades may be coupled to the one or more arms.

Referring to FIG. 3, the UAV 300 can comprise a plurality of sensors 318 configured to measure parameters of the environment surrounding the UAV 300. As described in further detail elsewhere herein, the plurality of sensors 318 may comprise a variety of types of sensors, including an image sensor, an ultrasonic sensor and/or a GPS sensor. The plurality of sensors 318 can be positioned on portions of the UAV 300 outside of a keep-out zone 310. As shown in FIG. 3, in some embodiments, the UAV 300 can have four sensors 318, one of the sensors 318 being positioned on a portion of each of the four arms 306 outside of the keep-out zone 310.

In some embodiments, the keep-out zone 310 may comprise a rotor blades spin space 312 for each of the sets of rotor blades 308, and an interference space 314. For example, the keep-out zone 310 may comprise four rotor blades spin spaces 312, one for each of the four sets of rotor blades 308. In some embodiments, a rotor blades spin space 312 can comprise a rotor disk of the corresponding set of rotor blades 308, or the space through which the corresponding set of the rotor blades 308 travels when the set of rotor blades 308 are spun during flight. In some embodiments, the rotor blades spin space 312 of a set of rotor blades 308 is the rotor disk of the set of rotor blades 308. In some embodiments, each of the plurality of rotor disks corresponding to the sets of rotor blades 308 may comprise a portion proximate to the central body 302, or an inner portion of the rotor disk. Each of the rotor disks may also comprise a portion opposite the portion proximate to the central body 302, or an outer portion of the rotor disk. For example, an inner portion of a rotor disk may comprise the portion of the rotor disk closest to the central body. An outer portion of a rotor disk may comprise the portion of the rotor disk further away from the central body. In some embodiments, the keep-out zone 310 is defined in part by the outer portion of each of the plurality of rotor disks. In some embodiments, the keep-out zone 310 is defined in part by the portion of each of the plurality of rotor disks furthest away from the central body 302.

In some embodiments, each of the sensors 318 is located further away from the central body 302 than the one or more rotor disks. Each of the rotor blades spin spaces 312 may be the space swept by the corresponding set of rotor blades 308 when the set of rotor blades are spun such that the rotor blades spin spaces 312 each comprise a circular shape, a diameter of the rotor blades spin space 412 being dependent on a length of a rotor blade of the corresponding set of rotor blades 308. As used herein, a length of a rotor blade refers to a longest dimension of the rotor blade. For example, the diameter may be the sum of the longest dimension of two rotor blades. Each of the rotor blades spin spaces 312 may be the rotor disk of the corresponding set of rotor blades 308 such that a height of a rotor blades spin space 312 can depend upon a width of a rotor blade of the corresponding set of rotor blades 308, such as a largest width of the rotor blade. As used herein, a width of a rotor blade is a dimension of the rotor blade which extends in a direction perpendicular or substantially perpendicular to the length of the rotor blade. In some embodiments, the rotor disk of a set of rotor blades 308 may extend at least partially over the central body 302 of the UAV. For example, the rotor disk of each of the four sets of rotor blades 308 may extend at least partially over the central body 302. In some embodiments, at least one of the rotor disks does not extend over the central body 302. In some embodiments, none of the rotor disks for the four sets of rotor blades 308 comprises any portion which extends over the central body 302. In some embodiments, two or more of the rotor disks may comprise at least a portion which is on the same horizontal plane with a portion of another of the rotor disks. In some embodiments, each of the four sets of rotor blades 308 are at the same height such that all corresponding portions of the rotor disks are horizontally coplanar or substantially horizontally coplanar. In some embodiments, one or more of the rotor disks comprises no portion which is horizontally coplanar with any portion of another one of the rotor disks. In some embodiments, two or more of the rotor disks may comprise respective portions which are on different horizontal planes. For example, all portions of one or more of the rotor disks may be at a height higher than any portion of one or more other of the rotor disks. In some embodiments, as described in further details herein, a rotor blades spin space may comprise a space larger than the rotor disk of a corresponding set of rotor blades. For example, a rotor blades spin space may comprise one or more dimensions longer than a corresponding dimension of the rotor disk. In some embodiments, a rotor blades spin space may have an upper boundary above the top surface of the rotor disk, a lower boundary below the bottom surface of the rotor disk, and/or a lateral boundary beyond a lateral surface of the rotor disk.

In some embodiments, the configuration of a rotor blades spin space may be selected based on the type of sensor used. For example, a keep-out zone for a UAV comprising a plurality of ultrasonic sensors may comprise a rotor blades spin space having an upper boundary, a lower boundary, and/or a lateral boundary of a rotor blades spin space above the top surface, below the bottom surface, and/or beyond a lateral surface, respectively, of the rotor disk, such that interference due to air flow generated by the rotor blades can be reduced or eliminated. In some embodiments, a keep-out zone for a UAV comprising only one or more of image sensors and GPS sensors may comprise a rotor blades spin space which is the rotor disk of the corresponding set of rotor blades, such that the field of view of the image sensors or measurements made by the GPS sensors are not degraded due to obstruction from one or more components of the UAV, such as by the spinning of the rotor blades, without unduly limiting portions of the UAV on which the sensors may be placed.

In some embodiments, the interference space 314 may be bounded by a lateral boundary comprising sides 316. For example, the interference space 314 can be defined at least in part by a lateral boundary comprising sides 316 which extend between adjacent propulsion units of corresponding rotor blades 308. In some embodiments, the sides 316 extend between vertical center axes of adjacent rotor disks and/or adjacent propulsion units, of corresponding sets of rotor blades 308. For example, a portion of each of the adjacent propulsion units may be outside of the interference space 314. In some embodiments, the sides 316 may extend between the vertical center axes of adjacent rotor blades 308. In some embodiments, the sides 316 may be linear or substantially linear. In some embodiments, the interference space 314 may have a quadrilateral shape. In some embodiments, the interference space 314 comprises a square. For example, the central body 302 may comprise a square shape, each of the four arms 306 extending perpendicularly or substantially perpendicularly from the four sides of the central body 302, such as a center or substantially a center of a horizontal dimension of each of the four sides, and each of the four sets of rotor blades 308 being equidistant or substantially equidistant from the central body 302 such that the interference space 314 comprises a square shape. In some embodiments, the sides 316 may be non-linear. In some embodiments, one or more of the sides 316 may comprise an arc, such as a convex and/or concave curve. The configuration of the sides may be selected based on, for example, a type of sensor being used. For example, the configuration of the sides may be selected such that the type or types of sensor used do not experience undesired interference when positioned outside of the keep-out zone 310. In some embodiments, a configuration of the sides may be selected such that an image sensor, ultrasonic sensor and/or GPS sensor does not experience undesired visual obstruction, acoustic noise or electromagnetic interference from one or more other portions of the UAV 310.

In some embodiments, an interference space may comprise a regular shape, such as a rectangle. As described herein, in some embodiments, the interference space may comprise a square. In some embodiments, an interference space may comprise an irregular shape, such as an irregular quadrilateral.

In some embodiments, at least a portion of the central body 302 is within the interference space 314. In some embodiments, the connection portions 304 of the adjacent sides of the central body 302 can be on the lateral boundary of the interference space 314, such as on a corresponding side 316 of the lateral boundary of the interference space 314. In some embodiments, the connection portions 304 may be completely within the interference space 314, for example within the space bounded by the sides 316 of the lateral boundary of the interference space 314.

In some embodiments, the keep-out zone 310 comprises both the rotor blades spin spaces 312 and the interference space 314. For example, sensors may be placed on portions of the UAV 300 that are outside of both the rotor blades spin spaces 312 and the interference space 314. In some embodiments, sensors are located further away from the central body 302 than any portion of rotor disks of the sets of rotor blades 308. In some embodiments, measurements made by sensors positioned on portions of the UAV 300 outside of both of the interference spaces 314 and rotor blades spin space 312 may experience diminished or no interference by another portion of the UAV 300 and/or due to the operation of any portion the UAV 300.

Figure 4:
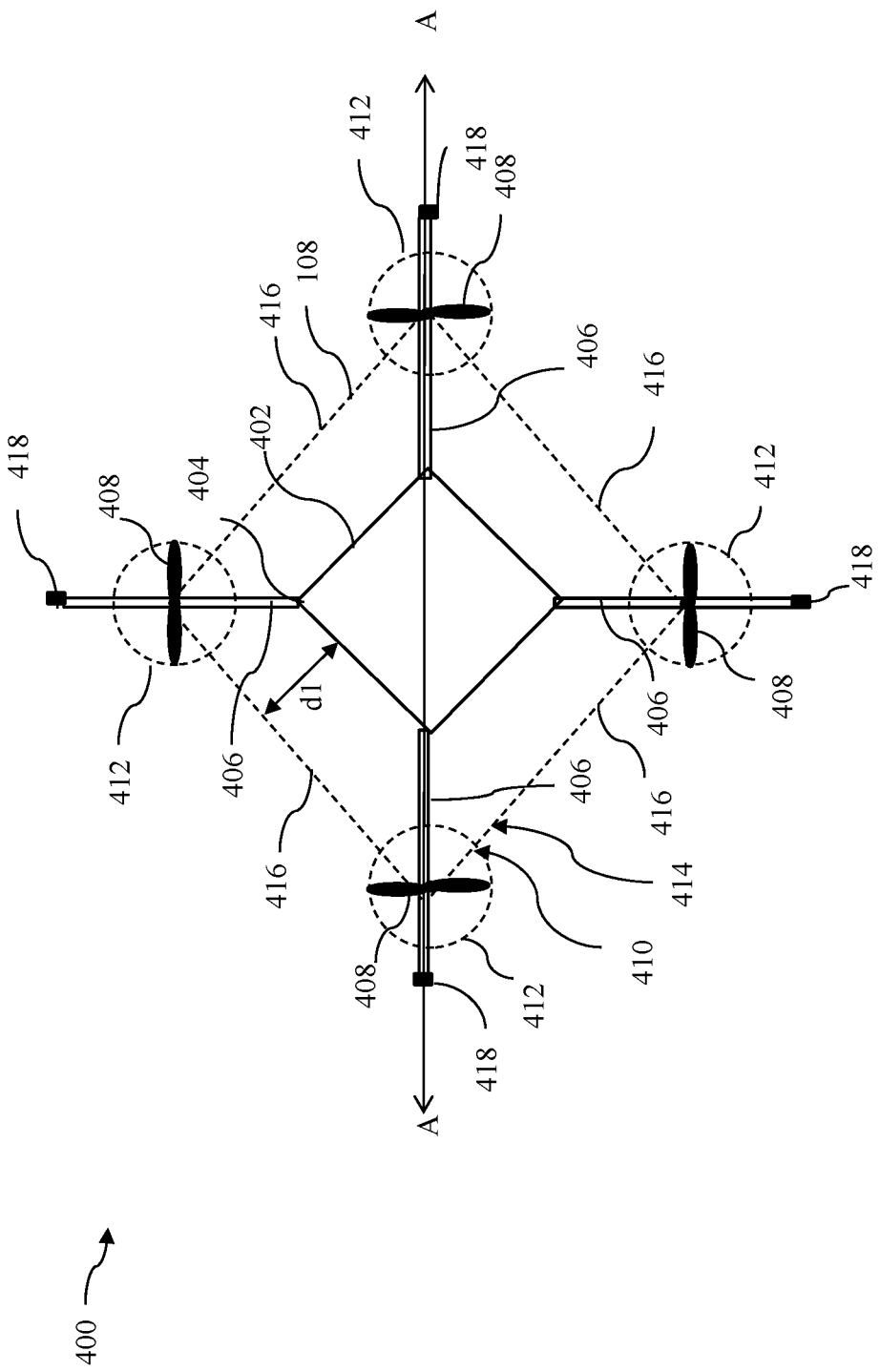
FIG. 4 is a schematic top-down view of another example of a UAV.

FIG. 4 is a top-down schematic view of another example of a UAV 400 and a keep-out zone 410. The UAV 400 can include a central body 402 having a quadrilateral shape, the adjacent sides of the quadrilateral meeting at the four connection portions 404, where an arm 406 extends outwardly away from the central body 402 at each of the connection portions 404. The UAV 400 may comprise a propulsion unit on each of the four arms 406. A set of rotor blades 408 of the propulsion unit may be coupled to each of the four arms 406 such that the UAV 400 is a quadcopter. As shown in FIG. 4, the UAV 400 may include a plurality of sensors 418 positioned on portions of the UAV 400 outside of the keep-out zone 410. A sensor 418 may be placed on each of the four arms 406 outside of the keep-out zone 410. In some embodiments, the keep-out zone 410 comprises an interference space 414 and a plurality of rotor blades spin spaces 412. For example, each of the sensors 418 may be placed on a distal portion of each of the four arms 406, where the distal portion of each of the four arms 406 is outside both the rotor blades spin spaces 412 and the interference space 414.

In some embodiments, as shown in FIG. 4, the interference space 414 may comprise a lateral boundary comprising sides 416 which extend between adjacent sets of rotor blades 408, such that lateral sides of the central body 402 are completely or substantially completely within the interference space 414. In some embodiments, the sides 416 extend between vertical center axes of adjacent rotor disks of corresponding sets of rotor blades 408. In some embodiments, the sides 416 may extend between corresponding center axes of adjacent sets of rotor blades 408. In some embodiments, at least a portion of a lateral side of the central body 402 may be a distance d1 from a portion of a corresponding side 416 of the interference space 414. In some embodiments, one or more lateral sides of the central body 402 are parallel or substantially parallel to a corresponding side 416 of the lateral boundary of the interference space 414. In some embodiments, each of the four lateral sides of the central body 402 can be parallel or substantially parallel to a corresponding side 416 of the interference space 414 such that each of the four lateral sides of the central body 401 are at a distance d1 from a corresponding side 416. In some embodiments, the central body 402 may have a square shape and each of the sets of rotor blades 408 may be equidistant or substantially equidistant from a corresponding connection portion 404 of the central body 402 such that the sides 416 of the lateral boundary of the interference space 414 form a square shape.

In some embodiments, the keep-out zone 410 may comprise a rotor blades spin space 412 for each set of rotor blades 408. In some embodiments, a rotor blades spin space 412 may comprise a rotor disk for a corresponding set of rotor blades 408. As shown in FIG. 4, a rotor blades spin space 412 may be the rotor disk of the corresponding set of rotor blades 408. For example, the rotor blades spin space 412 may comprise a circular shape, a diameter of the rotor blades spin space 412 being a longest dimension of the set of rotor blades 408, such as a total length of the set of rotor blades 408. A height of the rotor blades spin space 412 may depend upon a largest width of the set of rotor blades 408. As described herein, in some embodiments, a rotor blades spin space may be larger than the rotor disk of the corresponding set of rotor blades.

Figure 5:
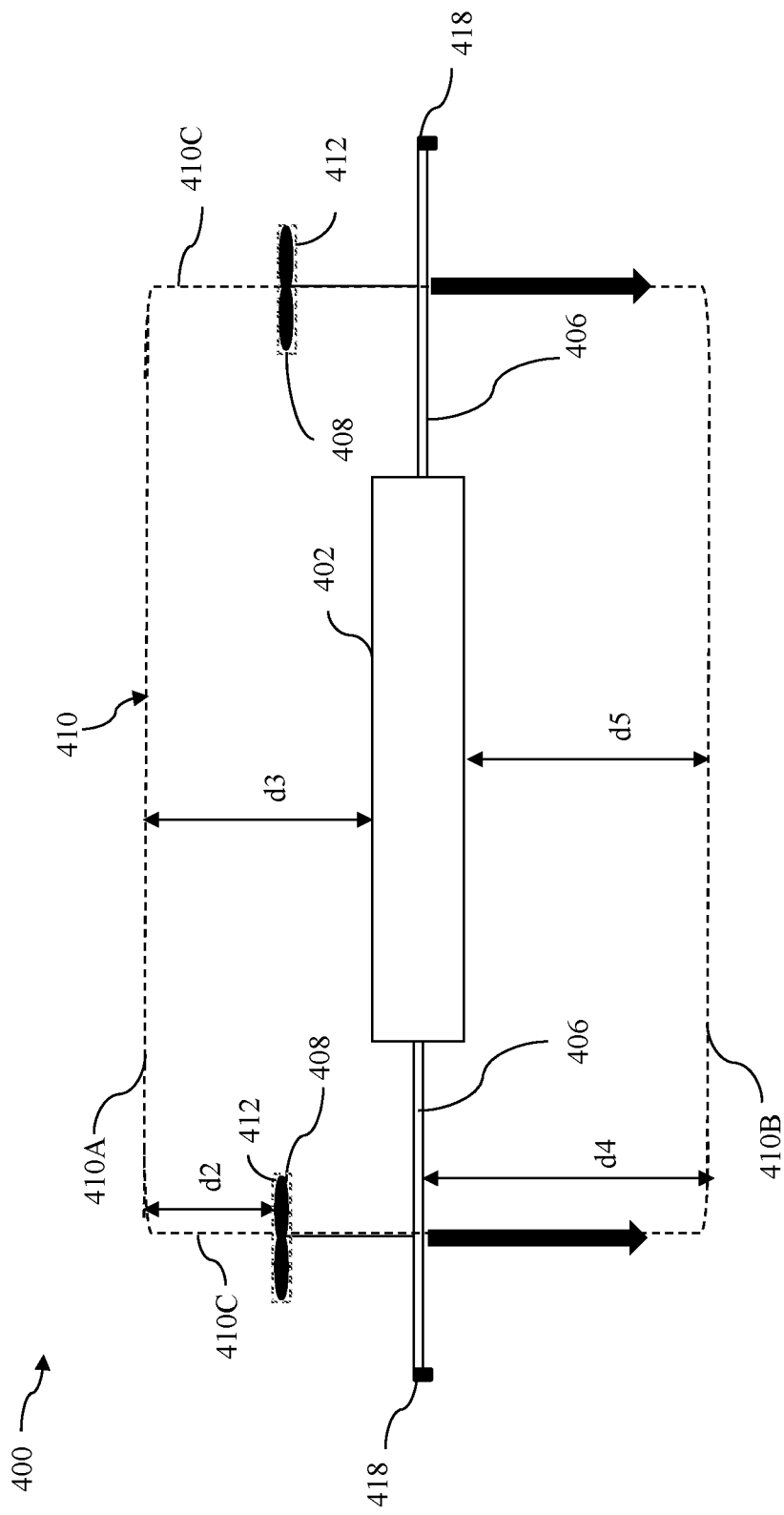
FIG. 5 is a schematic side cross-sectional view of the UAV of FIG. 4.

FIG. 5 is a side cross-sectional view of the UAV 400 and the keep-out zone 410 described with reference to FIG. 4. The cross-sectional view of FIG. 5 is taken along the A-A line shown in FIG. 4, the A-A line extending across opposing connection portions 404 of the central body 402. The cross sectional view may comprise a cross-sectional view of both the interference space 414 and rotor blades spin spaces 412. The keep-out zone 410 can have a top boundary 410A and a bottom boundary 410B. In some embodiments, the top boundary 410A of the keep-out zone 410 may comprise a portion which is above each of the rotor blades 408. In some embodiments, the keep-out zone 410 may comprise a portion which extends above the rotor disk of each of the sets of rotor blades 408. For example, the top boundary 410A of the keep-out zone 410 may have a portion which is a distance d2 above the top edge of each of the sets of rotor blades 408. In some embodiments, the top boundary 410A can have a portion which is a distance d3 above the top surface of the central body 402. In some embodiments, the distances d2 and d3 may be selected such that the top boundary 410A may comprise a portion that is planar or substantially planar. In some embodiments, the top boundary 410A of the keep-out zone 410 may be at a distance d2 above a top edge of each of the sets of rotor blades 408 and a distance d3 above the top surface of the central body 402 such that the top boundary 410A is planar or substantially planar. In some embodiments, a portion of the top boundary 410A may be at the top edge of each of the sets of rotor blades 408, for example, such that d2 for the portion of the top boundary 410A is zero. In some embodiments, the top boundary 410A may comprise a portion which is coplanar or substantially coplanar with the top surface of the rotor disks of each of the sets of rotor blades 408. In some embodiments, the top boundary 410A can comprise a portion which is at the top surface of the central body 402, for example, such that d3 is zero at the portion of the top boundary 410A. In some embodiments, the top boundary 410A can comprise a portion which is coplanar or substantially coplanar with the top surface of the central body 402. In some embodiments, the top boundary 410A is planar or substantially planar and is coplanar with the top surface of the rotor disks of the sets of rotor blades 408. In some embodiments, the top boundary 410A can be non-planar, for example comprising one or more portions which are curved.

In some embodiments, the bottom boundary 410B may comprise a portion which is below each of the arms 406. The bottom boundary 410B may comprise a portion which is a distance d4 below the bottom surface of each of the arms 406. The bottom boundary 410B may comprise a portion which is a distance d5 below the bottom surface of the central body 402. In some embodiments, the distances d4 and d5 are selected such that the bottom boundary 410B can comprise a portion which is planar or substantially planar. In some embodiments, the distances d4 and d5 are selected such that the bottom boundary 410B can be planar or substantially planar. In some embodiments, the bottom boundary 410B may comprise a portion at the bottom surface of the central body 402, for example such that d5 is zero at the portion of the bottom boundary 410B. In some embodiments, the bottom boundary 410B may comprise a portion at a bottom surface of one or more of the arms 406, for example such that d4 is zero at the portion of the bottom boundary 410B. In some embodiments, the bottom boundary 410B may be coplanar or substantially coplanar with the bottom surface of the central body 402. In some embodiments, the bottom boundary 410B can be non-planar, for example comprising one or more portions which are curved. In some embodiments, the distances d2, d3, d4 and/or d5 may be selected based on the type or types of sensors used such that sensors placed outside of the keep-out zone 410 can provide desired information for obstacle avoidance, without unduly limiting the positions of the UAV on which the sensors may be placed.

In some embodiments, the keep-out zone 410 can comprise a lateral boundary 410C. For example, sides 416 of the lateral boundary of the interference space 414 adjacent to one another may meet at the lateral boundary 410C. In some embodiments, the lateral boundary 410C may comprise portions which run through each of the propulsion units of the UAV 400. For example, the lateral boundary 410C may comprise corresponding portions which run through the center axes of rotor disks of each of the sets of rotor blades 408 and/or through the center axes of each of the sets of rotor blades 408. In some embodiments, the lateral boundary 410C may comprise one or more portions which are linear. Referring to FIG. 5, the rotor blades spin spaces 412 may each be the rotor disk for the corresponding set of rotor blades 408 such that the lateral boundary 410C comprises a portion of the boundary of the rotor disks. For example, the lateral boundary 410C may comprise a linear or substantially linear portion extending from the top of each of the rotor disks to the top boundary 410A, and a linear or substantially linear portion extending from the bottom of the rotor disks to the bottom boundary 410B.

In some embodiments, a lateral boundary may comprise one or more portions which are non-linear. For example, a lateral boundary may comprise one or more portions comprising an arc.

Figure 6:
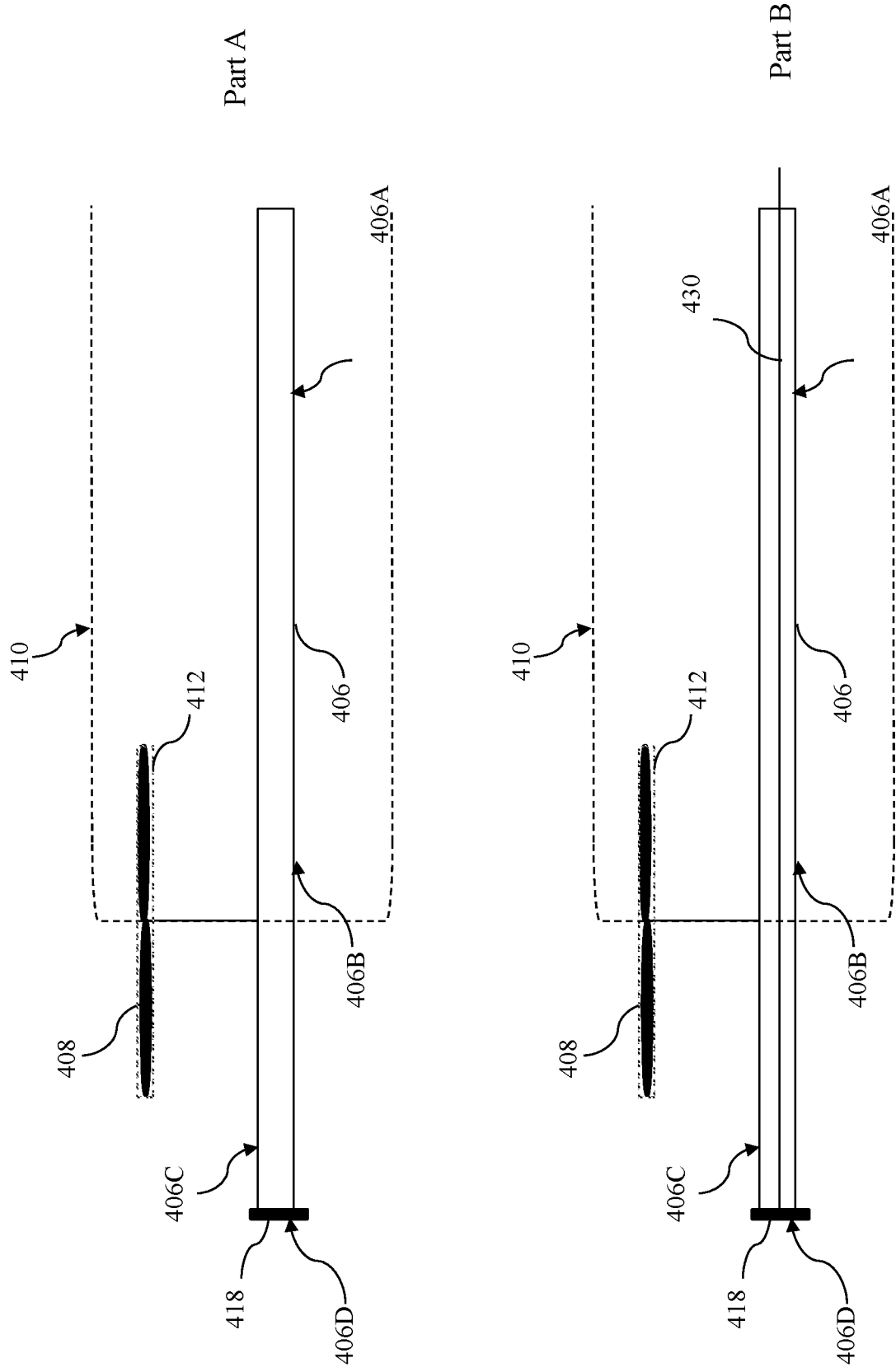
FIG. 6 shows a schematic side view and a schematic side cross-sectional view of an arm and a set of rotor blades of the UAV of FIG. 4.

Referring to FIG. 6 Part A, a schematic side view of an arm 406 of the UAV 400 is shown. The arm 406 can have a proximal portion 406A proximate to the central body 402 of the UAV 400 and an opposing distal portion 406B away from the central body 406. A set of rotor blades 408 can be coupled to the distal portion 406B of the arm 406. As shown in FIG. 6 Part A, the set of rotor blades 408 and a portion of the arm 406, including the proximal portion 406A of the arm 406, may be within the keep-out zone 410. The distal portion 406B of the arm 406 may comprise a portion 406C which is outside of the keep-out zone 410. A sensor 418 may be positioned on the arm 406 at a position within the portion 406C such that the sensor 418 is outside of the keep-out zone 410. In some embodiments, the sensor 418 may be positioned at a distal end 406D of the arm 406.

FIG. 6 Part B shows a schematic side cross-sectional view of the arm 406. In some embodiments, the arm 406 comprises at least a portion that is hollow such that at least a portion of the wiring 430 to provide communication between one or more controllers of the UAV 400 and the sensor 418 and/or to provide electrical power to the sensor 418 may be housed within the arm 406. In some embodiments, the controller may comprise one or more processors. In some embodiments, the controller comprises a flight controller and/or an inertial measurement unit (IMU). For example, the wiring 430 may provide communication between the sensor 418 with one or more processors of a flight controller and/or an IMU within the central body 402. In some embodiments, the sensor 418 may be at a distal end 406D of the arm 406 and an entire length of the arm 406 may be hollow such that wiring 430 for communication between the sensor 418 and one or more controllers housed within the central body 402 may extend from the central body 402 to the sensor 418 through the hollow shaft within the arm 406. In some embodiments, the arm 406 may comprise at least a portion which is not hollow such that at least a portion of the wiring 430 is routed on an outer surface of the arm 406.

Figure 7:
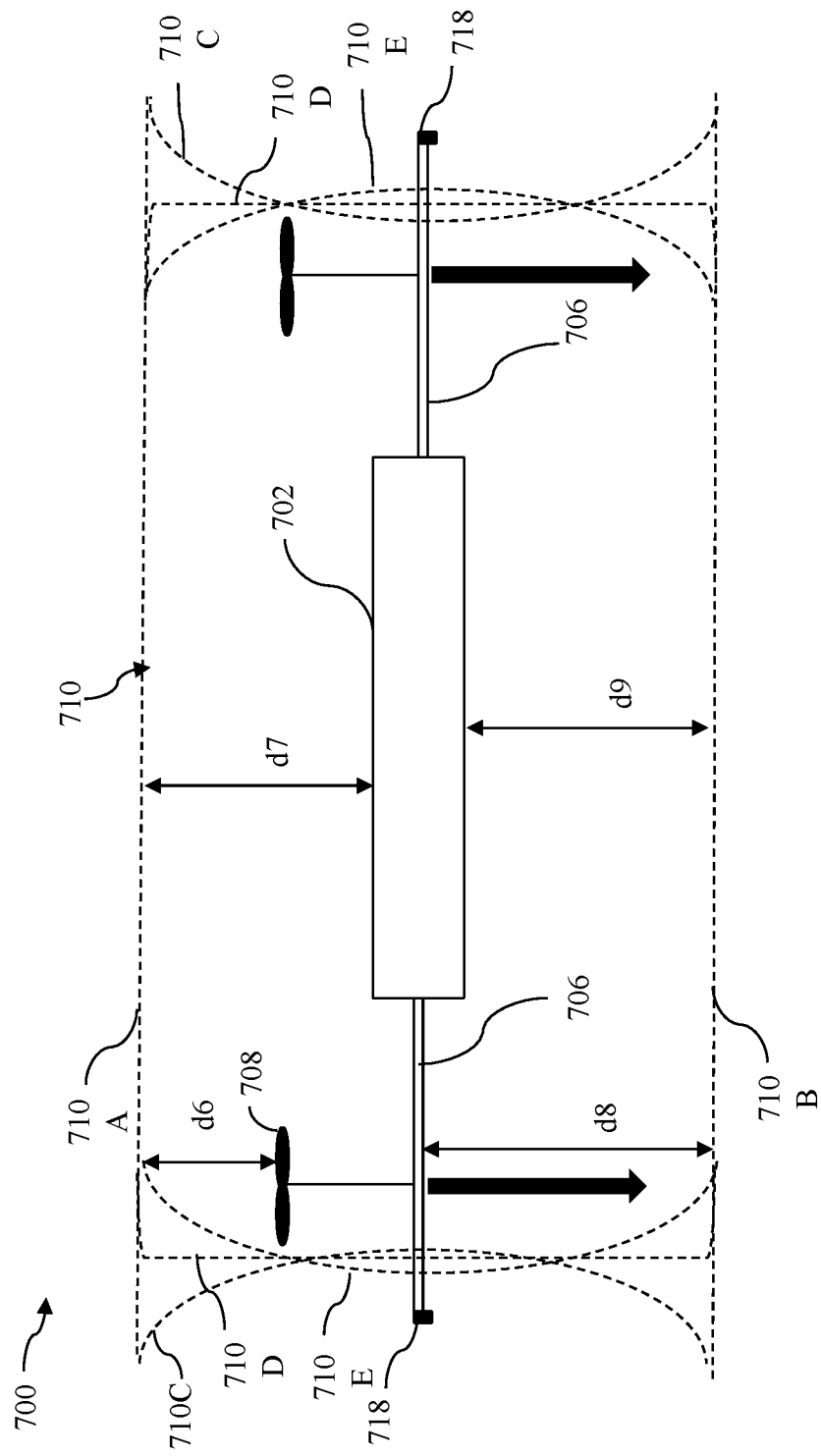
FIG. 7 is a schematic side cross-sectional view of another example of a UAV.

In FIG. 7, a side cross-sectional view of another example of a UAV 700 and a keep-out zone 710 is shown. As shown in FIG. 7, the UAV 700 may comprise a central body 702. In the cross-sectional view shown in FIG. 7, an arm 706 can extend outwardly from each of two opposing lateral surfaces of the central body 702, and a set of rotor blades 708 can be coupled to each of the arms 706. The central body 702 of the UAV 700 may comprise a quadrilateral shape such that the UAV 700 comprises a total of four arms extending outwardly from each of the four lateral sides of the central body 702, each of the arms 706 coupled to a corresponding set of rotor blades 708. The side cross-sectional view of FIG. 7 may be taken along a plane extending between opposing sets of rotor blades 708 coupled to arms 706 extending from opposing lateral surfaces of the central body 702. The UAV 700 may comprise a sensor 718 positioned on each of the arms 706 outside of the keep-out zone 710.

The keep-out zone 710 may comprise an interference space and a rotor blades spin space for each of the sets of rotor blades 708 of the UAV 700. The cross-sectional view of the keep-out zone 710 can include a cross-sectional view of a rotor blades spin space for each of the two sets of rotor blades 708 shown in FIG. 7 and the interference space. As described herein, in some embodiments, a rotor blades spin space for a set of rotor blades may be larger than a corresponding rotor disk of the set of rotor blades. For example, a rotor blades spin space may extend vertically and/or laterally beyond the corresponding rotor disk. For example, the rotor blades spin space may extend a distance above the top surface, below the bottom surface and/or laterally beyond a lateral surface of the rotor disk. Referring to FIG. 7, a rotor blades spin space for a set of rotor blades 708 may extend above, below and/or laterally beyond the rotor disk of each of the two sets of rotor blades 708 such that the keep-out zone 710 may comprise a top boundary 710A having a portion above the top edge of the sets of rotor blades 708, a bottom boundary 710B comprising a portion below the bottom edge of the sets of rotor blades 708 and/or a lateral boundary 710C, 710D or 710E comprising a portion to a side of a lateral edge of the sets of rotor blades 708.

In some embodiments, the top boundary 710A of the keep-out zone 710 may comprise a portion which is at a distance d6 above the top edge of each of the sets of rotor blades 708. In some embodiments, the bottom boundary 710B may comprise a portion which is a distance d7 above the top surface of the central body 702. In some embodiments, the top boundary 710A is planar or substantially planar. In some embodiments, the bottom boundary 710B may comprise a portion which is below each of the arms 706. The bottom boundary 710B may comprise a portion which is a distance d8 below the bottom surface of each of the arms 706. In some embodiments, the bottom boundary 710B may comprise a portion which is below the bottom surface of the central body 702. For example, the bottom boundary 710B may comprise a portion which is a distance d9 below the bottom surface of the central body 702.

In some embodiments, a portion of the top boundary 710A may be at the top edge of each of the sets of rotor blades 708, for example, such that d6 for the portion of the top boundary 710A is zero. In some embodiments, the top boundary 710A may comprise a portion which is coplanar or substantially coplanar with the top surface of the rotor disks of each of the sets of rotor blades 708. In some embodiments, the top boundary 710A can comprise a portion which is at the top surface of the central body 702, for example, such that d7 is zero at the portion of the top boundary 710A. In some embodiments, the top boundary 710A can comprise a portion which is coplanar or substantially coplanar with the top surface of the central body 402. In some embodiments, the top boundary 710A is planar or substantially planar and is coplanar with the top surface of the rotor disks of the sets of rotor blades 708. In some embodiments, the top boundary 710A can be non-planar, for example comprising one or more portions which are curved.

In some embodiments, the distances d8 and d9 are selected such that the bottom boundary 710B can comprise at least a portion which is planar or substantially planar. In some embodiments, the distances d8 and d9 are selected such that the bottom boundary 710B can be planar or substantially planar. In some embodiments, the bottom boundary 710B may comprise at least a portion at the bottom surface of the central body 702, for example such that d9 is zero at the portion of the bottom boundary 710B. In some embodiments, the bottom boundary 710B may comprise a portion at the bottom surface of one or more of the arms 706, for example such that d8 is zero at the portion of the bottom boundary 710B. In some embodiments, the bottom boundary 710B may be coplanar or substantially coplanar with the bottom surface of the central body 702. In some embodiments, the bottom boundary 710B can be non-planar, for example comprising one or more portions which are curved.

In some embodiments, the keep-out zone 710 may comprise a lateral boundary 710C, 710D or 710E comprising at least a portion which is to a side of a lateral edge of the two sets of rotor blades 708 such that the propulsion units of the UAV 700 are completely or substantially within the keep-out zone 710. In some embodiments, a lateral boundary 710C, 710D or 710E of the keep-out zone 710 may comprise at least a portion which is both above the top edge and to a side of a lateral edge of each of the sets of rotor blades 708. In some embodiments, the keep-out zone 710 may comprise a lateral boundary 710C, 710D or 710E comprising at least a portion which is below the bottom edge of each of the two sets of rotor blades 708. In some embodiments, a lateral boundary 710C, 710D or 710E of the keep-out zone 710 may comprise at least a portion which is both below the bottom edge and to a side of a lateral edge of each of the sets of rotor blades 708. In some embodiments, the lateral boundary can comprise various suitable profiles. In some embodiments, the lateral boundary 710D may comprise a portion which is linear or substantially linear. In some embodiments, the lateral boundary 710C or 710E may comprise a portion which comprises an arc. In some embodiments, the lateral boundary 710C may comprise at least a portion comprising a concave profile. In some embodiments, the lateral boundary 710E may comprise at least a portion comprising a convex profile. In some embodiments, the lateral profile 710C or 710E may comprise a curved profile such that the propulsion units are entirely or substantially entirely within the keep-out zone 710. In some embodiments, the lateral boundary 710D may have a linear or substantially linear profile and is to a side of a lateral edge of each of the sets of rotor blades 708 such that the propulsion units are entirely or substantially entirely within the keep-out zone 710.

Figure 8:
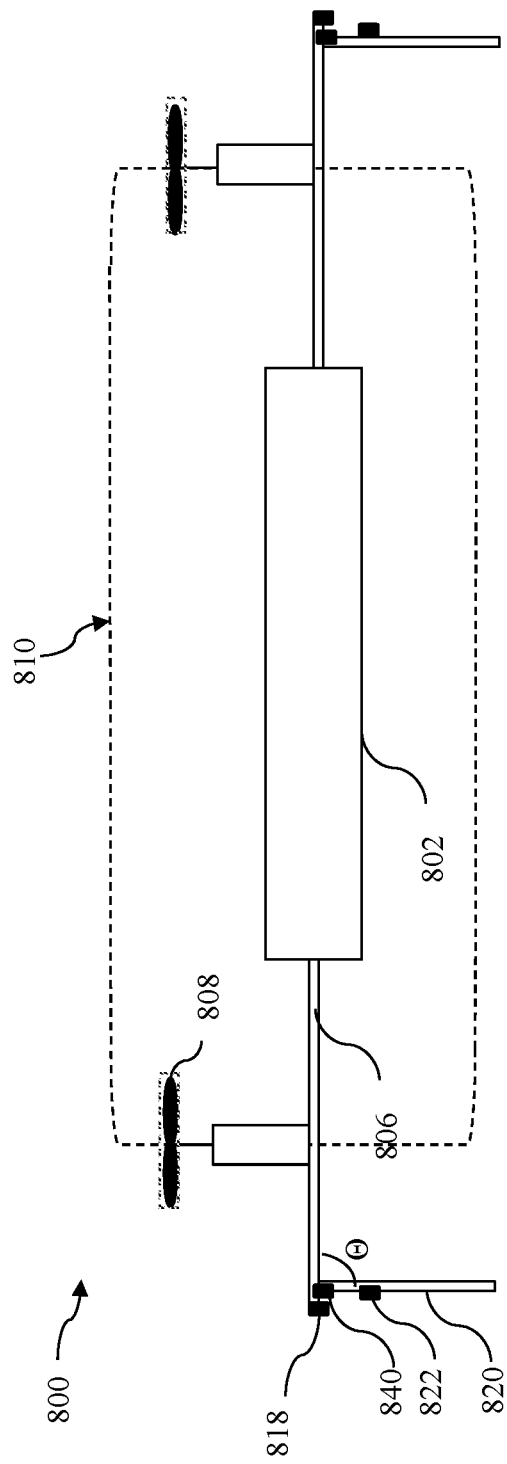
FIG. 8 is a schematic side cross-sectional view of an example of a UAV comprising a sensor on a landing stand.

Referring to FIG. 8, a schematic side cross-sectional view of an example of a UAV 800 comprising sensors 822 on landing stands 820 of the UAV 800 is shown. The UAV 800 may comprise a central body 802 and an arm 806 extending outwardly from each of the lateral surfaces of the central body 802. In the side cross-sectional view of FIG. 8, an arm 806 is shown as extending outwardly from each of two opposing lateral surfaces of the central body 802. Each of the arms 806 may be coupled to a corresponding set of rotor blades 808. A corresponding landing stand 820 may extend from each of the arms 806. The landing stand 820 may not be retractable and/or foldable to a lower profile configuration when the landing stand 820 is not in-use by the UAV 800, such as during flight. For example, the landing stand 820 may be rigidly attached to the arm 806 such that the landing stand 820 may not be rotated relative to the arm 806 to fold and/or retract the landing stand 820 to a lower profile configuration, thereby maintaining the same position both during flight and during landing. In some embodiments, the landing stand 820 and the corresponding arm 806 are integrally formed. In some embodiments, the landing stand 820 is coupled to the corresponding arm 806. For example, a process for assembling the UAV 800 may comprise mechanically coupling the landing stand 820 to its corresponding arm 806. In some embodiments, the UAV 800 may comprise a mechanical and/or electrical connector at the connection portion between the arm 806 and the landing stand 820. For example, the UAV 800 may comprise a connector 840 comprising mating connection portions for providing mechanical and/or electrical connection between the landing stand 820 and the corresponding arm 806. In some embodiments, the connector 840 can comprise corresponding mechanical and/or electrical mating portions, such as female and male connectors for physical and/or electrical connection between mechanical components and/or electrical components (e.g., electrical wiring) of the landing stand 820 and the arm 806.

Referring to FIG. 8, in some embodiments, at least a portion of each of the arms 806 and at least a portion of each of the landing stands 820 may be outside of a keep-out zone 810. In some embodiments, each of the landing stands 820 may be perpendicular or substantially perpendicular to its corresponding arm 806. For example, the angle denoted as "Θ" in FIG. 8 may be 90°. As shown in FIG. 8, each of the landing stands 820 may extend perpendicularly or substantially perpendicularly from a portion of the arm 806 outside of the keep-out zone 810 such that the landing stands 820 are entirely or substantially entirely outside of the keep-out zone 810. For example, the landing stand 820 may extend from the corresponding arm 806 from a position laterally further away from the central body 802 than the rotor disk of the rotor blades 808 coupled to the arm 806. In some embodiments, a landing stand 820 may extend downward from a distal end of the arm 806. The UAV 800 may comprise a sensor 822 on a portion of each of the landing stands 820 that is outside of the keep-out zone 810. In some embodiments, the UAV 800 may comprise both a sensor 818 on a portion of each of the arms 806 outside of the keep-out zone 810 and a sensor 822 on a portion of each of the landing stands 822 outside of the keep-out zone 810.

In some embodiments, a landing stand may extend perpendicularly or substantially perpendicularly from a corresponding arm such that only a portion of the landing stand is outside of a keep-out zone. In some embodiments, a landing stand may be fixedly coupled to, or integrally formed with and extend rigidly from, a distal end of an arm such that only a portion of the landing stand is outside of a keep-out zone of the UAV. For example, the UAV may comprise a sensor on a portion of the landing stand outside of the keep-out zone, such as on a surface of the landing stand facing away from the central body and outside of the keep-out zone. In some embodiments, a landing stand may extend perpendicularly or substantially perpendicularly from a distal end of each of the arms of a UAV, and a sensor may be positioned on a portion of each of the landing stands outside of the keep-out zone of the UAV.

In some embodiments, a landing stand may extend from a corresponding arm at an angle other than 90°. For example, a landing stand may be fixedly coupled to, or integrally formed with and extend rigidly from, a corresponding arm at an angle greater than 90°. In some embodiments, a landing stand may extend from a portion of the UAV other than an arm. The landing stand may extend from a portion of a central body of the UAV, for example being integrally formed with the central body or fixedly coupled to the central body. In some embodiments, the landing stand may extend from the central body at an angle greater than 90° such that a portion of the landing stand proximal to the central body is inside the keep-out zone and a distal portion of the landing stand away from the central body is outside of the keep-out zone.

Figure 9:
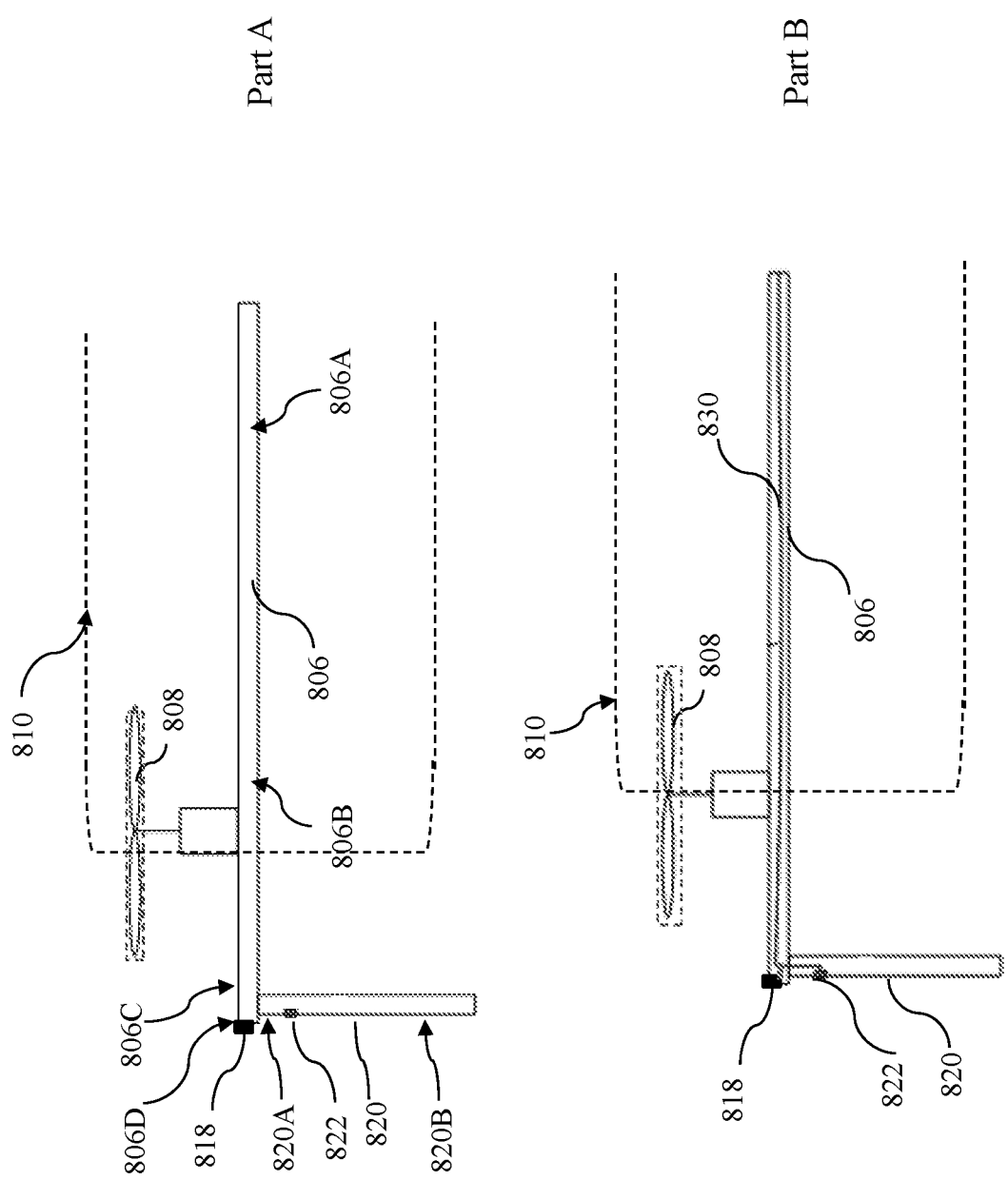
FIG. 9 shows a schematic side view and a schematic side cross-sectional view of an arm, a set of rotor blades and a landing stand of the UAV of FIG. 8.

FIG. 9 Part A is a schematic side view of an arm 806 and a corresponding landing stand 820 fixedly extending from the arm 806. As described herein, the UAV 800 may comprise both a sensor 818 on a portion of the arm 806 outside of the keep-out zone 810 and a sensor 822 on a portion of the landing stand 822 outside of the keep-out zone 810. The arm 806 may comprise a proximal portion 806A proximate to the central body 802 and a distal portion 806B away from the central body 802, where the distal portion 806B comprises a portion 806C outside of the keep-out zone 810. The sensor 818 may be positioned on the portion 806C of the arm 806 outside of the keep-out zone 810, such as at a distal end 806D of the arm 806. The landing stand 820 is shown in FIG. 9 Part A as being entirely outside of the keep-out zone 810. The landing stand 820 may extend perpendicularly or substantially perpendicularly from the portion 806C of the arm 806 such that the landing stand 820 is entirely outside of the keep-out zone 810. In some embodiments, the sensor 822 may be positioned on various portions of the landing stand 820. In some embodiments, the sensor 822 can be on a proximal portion 820A of the landing stand 820 proximate to the arm 806, rather than on a distal portion 820B away from the arm 806, such that the sensor 822 is further away from a landing surface. Positioning a sensor 822 on a proximal portion 820A of the landing stand 820 may eliminate or reduce damage to the sensor 822 when the UAV 800 is landing. In some embodiments, the sensor 822 may be on a portion of the landing stand 820 facing away from the central body 802 to reduce or eliminate interference. In some embodiments, the sensor 822 may be on a surface of the landing stand 820 opposite that facing the central body 802.

FIG. 9 Part B is a schematic side cross-sectional view of an arm 806 and a corresponding landing stand 820 fixedly extending from the arm 806. In some embodiments, the arm 806 comprises at least a portion that is hollow such that at least a portion of the wiring 830 to provide communication between one or more controllers of the UAV 800 and/or to supply electrical power to a sensor may be housed within the arm 806. In some embodiments, the landing stand 820 comprises at least a portion of which that is hollow such that at least a portion of the wiring 830 to provide communication between one or more controllers of the UAV 800 and a sensor may be housed within the landing stand 820. In some embodiments, both the arm 806 and the landing stand 820 can comprise at least a portion of which that is hollow such that the wiring 830 may extend from the central body to the sensor 818 and the sensor 822. For example, the sensor 818 may be at a distal end 806D of the arm 806 and an entire length of the arm 806 may be hollow such that wiring 830 for communication between the sensor 818 and one or more controllers housed within the central body 802 may extend from the central body 802 to the sensor 818 through the hollow shaft within the arm 806. At least a portion of the landing stand 802 may be hollow such that wiring 830 may extend through at least a portion of the landing stand 820 for providing communication between the sensor 822 and one or more controllers within the central body 802. For example, the wiring 830 may extend from the central body 802 through at least a portion of the arm 806 and at least a portion of the landing stand 820 to connect the sensor 822 with one or more controllers. In some embodiments, wiring for providing communication between controllers within the central body 802 and the sensors may not be routed through the arm 806 or the landing stand 820. In some embodiments, the arm 806 and the landing stand 820 are not hollow and the wiring 830 is routed along an outer surface of the arm 806 and the landing stand 820, such as being wrapped around the outer surface and the landing stand 820. In some embodiments, the wiring 830 may comprise a first portion which extends from the central body to a connection portion between the arm 806 and the landing stand 820, and a second portion which extends from the connection portion to the sensor 822. In some embodiments, the first and second portions of the wiring 830 may be mechanically and electrically coupled together such that an electrical signal can travel between the central body to the sensor 822 on the landing stand 820. For example, the mechanical coupling may comprise mechanical mating between respective ends of the first and second portions of the wiring 830. In some embodiments, the electrical coupling may be via an electrical and/or electronic interface. For example, an electrical and/or electronic interface may comprise a Universal Serial Bus (USB) interface, an auxiliary interface, combinations thereof and/or the like. In some embodiments, the electrical and/or electronic interface can provide one way or two way communication.

Figure 10:
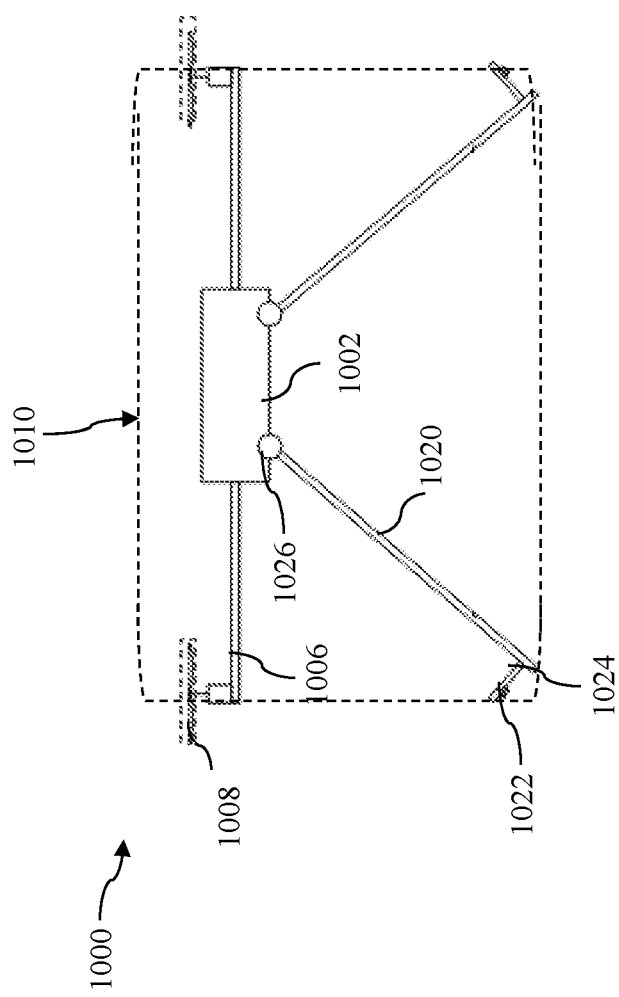
FIG. 10 is a schematic side cross-sectional view of another example of a UAV comprising a sensor on a landing stand, where the landing stand of the UAV is in an extended state.

FIG. 10 is a schematic side cross-sectional view of an example of a UAV 1000 comprising a landing stand 1020 which is rotatably coupled to a central body 1002 of the UAV 1000. The UAV 1000 may comprise an arm 1006 extending outwardly from the central body 1002. As shown in FIG. 10, an arm 1006 may extend outwardly from each of opposing lateral surfaces of the central body 1002. Each of the arms 1006 may be coupled to a corresponding set of rotor blades 1008. In some embodiments, a propulsion unit of the UAV 1000 is at or substantially at a distal end of the arm 1006. For example, each of the set of rotor blades 1008 may be coupled to a distal end portion of the arms 1006. The central body 1002 may be coupled to a pair of landing stands 1020, and a sensor 1022 may be positioned on a portion of each of the landing stands 1020. Each of the landing stands 1020 may be rotatably coupled to the central body 1002 at a pivot portion 1026. The landing stand 1020 may be rotated around the pivot portion 1026 such that the landing stand 1020 can be rotated relative to the central body 1002. For example, a landing stand 1020 may be rotated closer to an arm 1006 or rotated away from the arm 1006. FIG. 10 shows each of the landing stands 1020 rotated away from the arms 1006, for example in an extended state. The landing stand 1020 may be in an extended state when the landing stand 1020 is in use, such as when the UAV 1000 is preparing for landing or when the UAV 1000 is on a landing surface. As shown in FIG. 10, each of the landing stands 1020 in the extended state may be entirely within or substantially entirely within the keep-out zone 1010.

Figure 11:
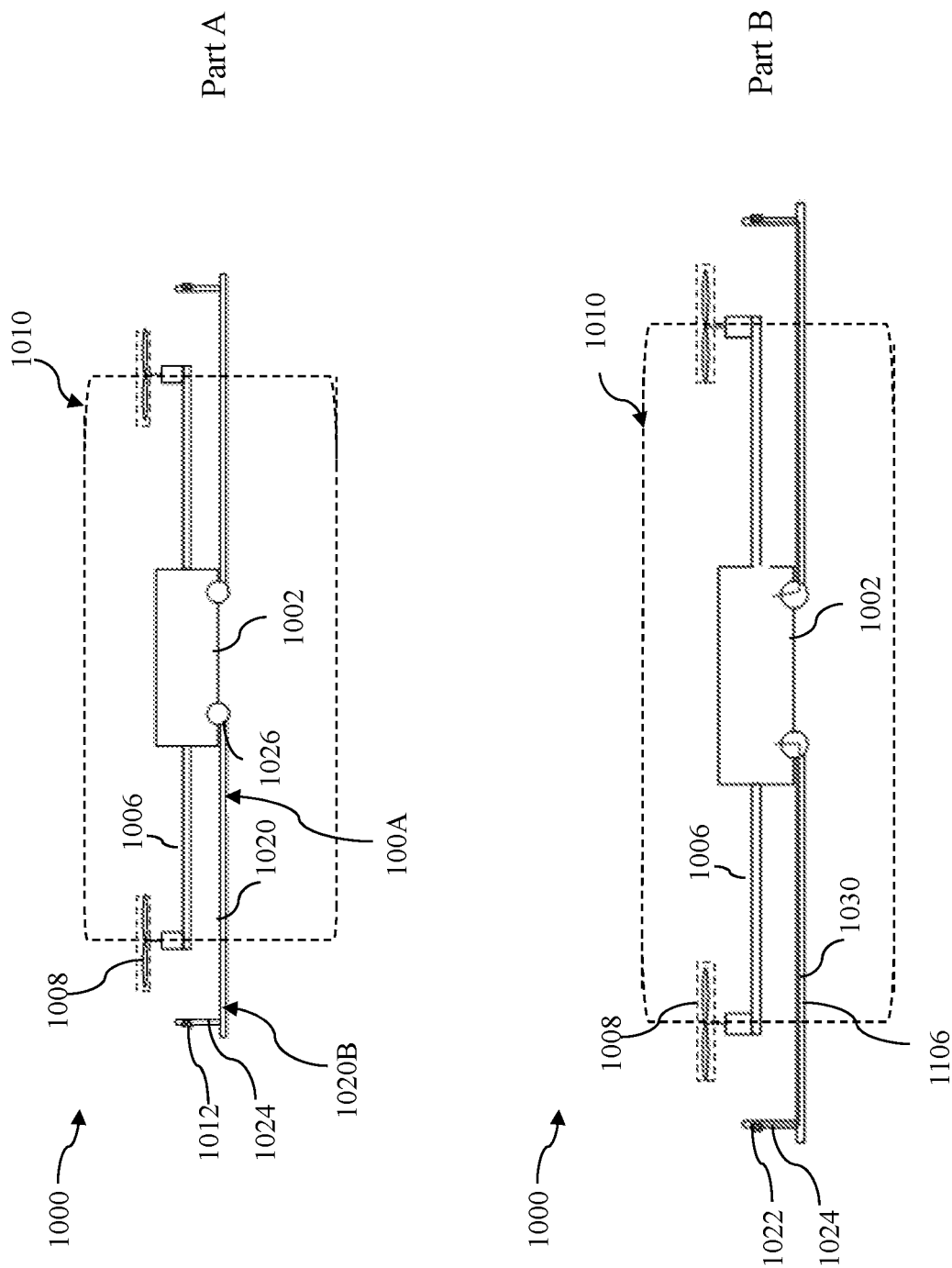
FIG. 11 shows a schematic side view and a schematic side cross-sectional view of the UAV of FIG. 10, where the landing stand of the UAV is in a retracted state.

FIG. 11 Part A shows the UAV 1000 having the landing stand 1020 rotated toward the central body 1002, for example in a retracted state. The landing stand 1020 may be in the retracted state when the landing stand 1020 is not in use, such as during flight. In the retracted state, the landing stand 1020 may comprise a proximal portion 1020A proximate to the central body 1002 which is within the keep-out zone 1010, and a distal portion 1020B away from central body 1002 which is outside of the keep-out zone 1010. A sensor 1022 may be positioned on a portion of each of the landing stands 1020 that can be outside of the keep-out zone 1010 when the landing stand 1020 is in the retracted state. In some embodiments, the sensor 1022 can be positioned on a portion of the landing stand 1020 facing away from the central body 1002. For example, a protrusion 1024 on the distal portion 1020B of the landing stand 1020 may be outside of the keep-out zone 1010 when the landing stand 1020 is in the retracted state. The sensor 1022 may be on the protrusion 1024 such that the sensor 1022 can be outside of the keep-out zone 1010 when the landing stand 1020 is in the retracted state. In some embodiments, the sensor 1022 can be positioned on a portion of the protrusion 1024 facing away from the central body 1002, including on a surface of the protrusion 1024 opposite that facing the central body 1002.

FIG. 11 Part B is a schematic side cross-sectional view of the UAV 1000 in a retracted state, where the landing stands 1020 may comprise at least a portion of which that is hollow such that the wiring 1030 to provide communication between one or more controllers of the UAV 1000 and the sensors 1022 and/or supply electrical power to the sensors 1022 may be housed at least partially within the landing stands 1020. For example, at least a portion of the landing stands 1020, including at least a portion of the protrusions 1024 on which the sensors 1022 are positioned, may be hollow such that wiring 1030 from one or more components within the central body 1002 may be entirely or substantially entirely enclosed within one or more portions of the UAV 100. For example, the portion of the wiring 1030 extending through the landing stands 1020 may be entirely housed within the landing stands 1020. In some embodiments, each of the landing stands 1020 comprises at least a portion which is not hollow such that at least a portion of the wiring 1030 is routed along an outer surface of the landing stand 1020, such as being wrapped around the outer surface. In some embodiments, each of the landing stands 1020 is not hollow. In some embodiments, the wiring 1030 is route entirely or substantially entirely along an outer surface of each of the landing stands 1020.

Figure 12:
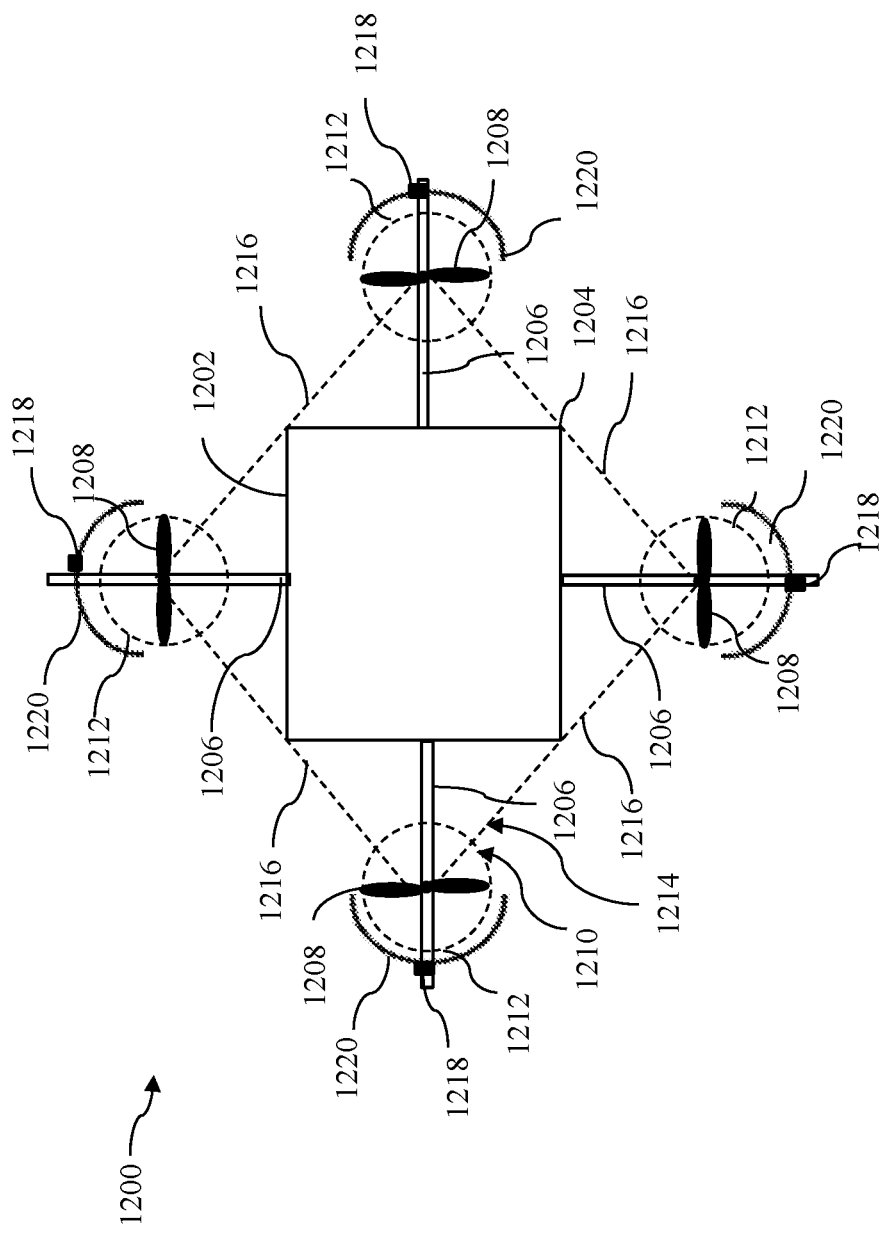
FIG. 12 is a schematic top-down view of an example of a UAV comprising a plurality of protective covers.

FIG. 12 is a top down schematic diagram of another example of a UAV 1200. The UAV 1200 may have one or more properties as described herein. For example, the UAV 1200 may include a central body 1202, an arm 1206 extending from each of four lateral surfaces of the central body 1202 and a corresponding set of rotor blades 1208 coupled to each of the arms 1206. The UAV 1200 may also comprise a plurality of protective covers 1220. The protective covers 1220 may be configured to provide physical protection for each of the rotor blades 1208 and/or other portions of the UAV 1200 from impact by another object. For example, the UAV 1200 may comprise a protective cover 1220 for each of the sets of rotor blades 1208 from collision with another object or surface during flight or landing, thereby reducing or preventing damage to the rotor blades 1208. In some embodiments, the protective covers 1220 can provide protection from external impact for both the sets of rotor blades 1208 and the central body 1202 of the UAV. In some embodiments, each of the protective covers 1220 may be coupled to a corresponding arm 1206. For example, a protective cover 1220 may be coupled to a corresponding arm 1206 such that the protective cover 1220 can provide protection for the set of rotor blades 1208 coupled to the arm 1206. A protective cover 1220 may be positioned relative to a corresponding rotor disk so as to provide desired protection for the corresponding set of rotor blades 1208 without impeding spinning of the rotor blades 1208. In some embodiments, each of the protective covers 1220 may partially surround the rotor disk of the corresponding set of rotor blades 1208. For example, the protective covers 1220 may comprise a partial ring shape, and may be positioned proximate and/or adjacent to the rotor disk of the corresponding set of rotor blades 1208 such that protective cover 1220 partially surrounds the rotor disk of the rotor blades 1208. In some embodiments, the protective cover 1220 may have a thickness and/or height configured to provide desired protection for the corresponding set of rotor blades 1208. In some embodiments, a height of at least a portion of a protective cover 1220 may be the same or greater than a height of a corresponding portion of the rotor disk of the corresponding rotor blades 1208. The protective covers 1220 may be oriented relative to the corresponding set of rotor blades 1208 to provide desired physical protection for the rotor blades 1208 when the UAV 1200 comes into contact with another object. In some embodiments, each of the protective covers 1220 may be positioned proximate to or adjacent to the rotor disk of the corresponding set of rotor blades and oriented such that at least a portion of each of the protective covers 1220 is further away from the central body 1202 than any edge of the rotor disk. For example, each of the protective covers 1220 may be oriented such that the openings of the protective covers 1220 are positioned closest to the central body 1202 and the partial ring portions of the protective covers 1220 are positioned away from the central body 1202. As shown in FIG. 12, in some embodiments, the protective covers 1220 may comprise a half ring shape and the openings of the protective covers 1220 are positioned proximate to the central body 1202.

In some embodiments, the UAV 1200 may comprise a sensor 1218 on a portion of a protective cover 1220. A sensor 1218 may be positioned on each of the protective covers 1220. In some embodiments, the sensors 1218 may be positioned on a portion of a protective cover 1220 outside of the keep-out zone 1210. The keep-out zone 1210 may have one or more features as described herein. As described herein, the keep-out zone 1210 may comprise a rotor blades spin space 1412 for each set of rotor blades 1208, and an interference space 1214. A rotor blades spin space 1412 may comprise the rotor disk of the corresponding set of rotor blades 1208. In some embodiments, a rotor blades spin space 1412 can be the rotor disk of the corresponding set of rotor blades 1208. The interference space 1214 may comprise a lateral boundary comprising sides 1216 extending between adjacent sets of rotor blades 1208 of the UAV 1200. The connection portions 1204 of adjacent lateral surfaces of the central body 1202 may be on corresponding sides 1216 of the lateral boundary of the interference space 1214. In some embodiments, the connection portions 1204 of adjacent lateral surfaces of the central body 1202 are completely within the interference space 1214 such that the central body 1202 is completely within the interference space 1214. In some embodiments, the sensors 1218 may be positioned on a portion of the protective covers 1220 outside of both the rotor blades spin spaces 1212 and the interference space 1214. In some embodiments, one or more of the sensors 1218 may be positioned on a portion of the protective cover 1220 facing away from the rotor blades 1208 and/or the central body 1202. In some embodiments, one or more of the sensors 1218 may be positioned on a portion of the protective cover 1220 opposite a portion facing the rotor blades 1208 and/or the central body 1202. In some embodiments, each of the protective covers 1220 of the UAV 1200 comprises a sensor 1218 on a portion of the protective covers 1220 furthest away from the central body 1202, such as on a distal most portion of the protective covers 1220 facing away from the central body 1202.

Figure 13:
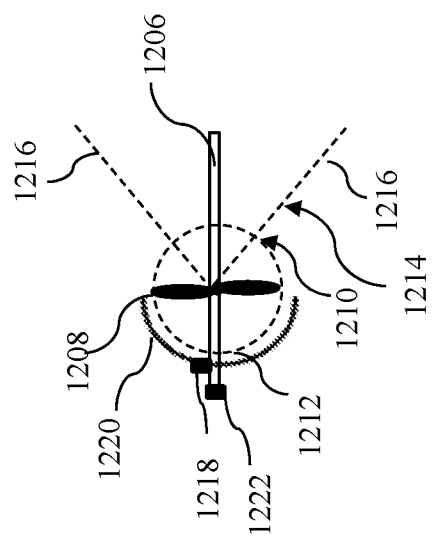
FIG. 13 is a schematic top-down view of one of the protective covers of FIG. 12.

Referring to FIG. 13, a top-down schematic diagram of one of the protective covers 1220, and a set of corresponding rotor blades 1208 coupled to an arm 1206, are shown. As shown in FIG. 13, in some embodiments, the UAV 1200 can comprise both the sensor 1218 on the protective cover 1220 and a sensor 1222 on the arm 1206, the sensor 1218 on the protective cover 1220 and the sensor 1222 on the arm 1206 both being outside of the rotor blades spin space 1212 and the interference space 1214. The sensor 1218 may be positioned on a surface of the protective cover facing away from the central body. For example, the sensor 1218 may be on a portion of the protective cover furthest away from the central body and on a surface facing away from the central body. In some embodiments, the sensor 1222 may be positioned on a distal end of the arm 1206 furthest away from the central body. In some embodiments, the UAV 1200 may comprise a sensor 1222 on a portion of each of its arms 1206 outside of the keep-out zone 1210.

Figure 14:
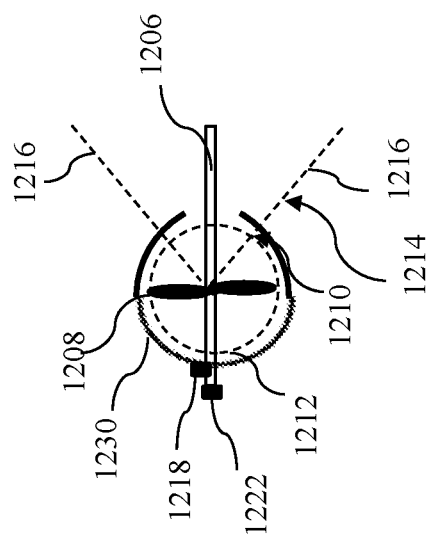
FIG. 14 is a schematic top-down view of a portion of the UAV of FIG. 12 comprising another example of a protective cover.

Referring to FIG. 14, a top-down schematic diagram of another example of a protective cover 1230 is shown. The protective cover 1230 may be coupled to an arm 1206 and positioned proximate or adjacent to the rotor disk of the set of rotor blades 1208 coupled to the arm 1206. The protective cover 1230 may comprise a partial ring shape and may surround more than half of the perimeter of the rotor disk. The protective cover 1230 may be positioned proximate or adjacent to the set of rotor blades 1208 and oriented such that the opening in the partial ring of the protective cover 1230 is closest to the central body. For example, the protective cover 1230 may comprise a portion which extends around a portion of the rotor disk of the rotor blades 1208 opposite that closest to the central body. In some embodiments, the protective covers 1230 are configured to provide protection from external impact for both the rotor blades 1408 and the central body of the UAV. As shown in FIG. 14, in some embodiments, the UAV 1200 can comprise a sensor 1218 on the protective cover 1230 and a sensor 1222 on the arm 1206. The sensor 1218 may be positioned on a surface of the protective cover 1230 facing away from the central body, including on a portion of the protective cover 1230 furthest away from the central body. In some embodiments, the UAV 1200 comprises both a sensor 1222 on a portion of the arm 1206 and a sensor 1218 on protective cover 1230 outside of the keep-out zone 1210. For example, the UAV 1200 may comprise a sensor 1222 at a distal end of the arm 1206 furthest away from the central body 1202 and a sensor 1218 on a portion of the protective cover 1230 facing away from the central body 1202, such that the sensors 1222 and 1218 are outside of both the rotor blades spin space 1212 and the interference space 1214. In some embodiments, the UAV 1200 may comprise a sensor 1222 on a portion of each of its arms 1206 outside of the keep-out zone 1210.

Figure 15:
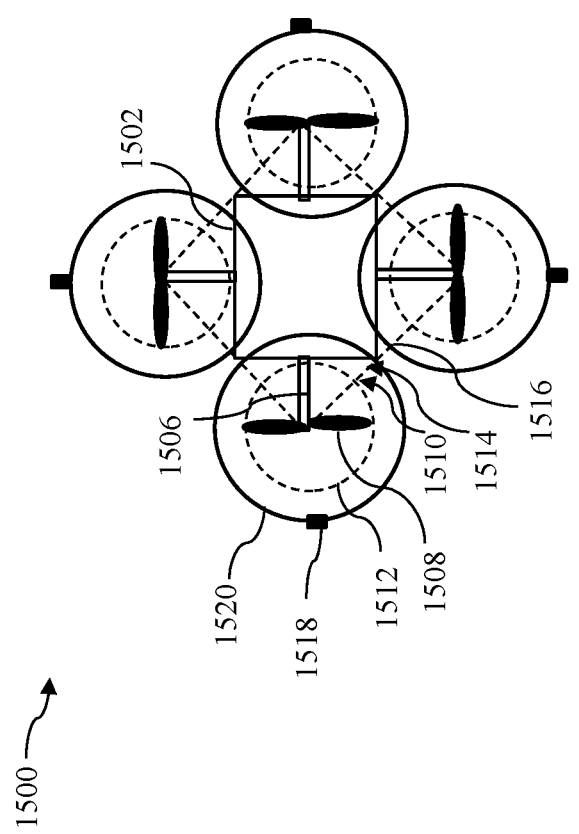
FIG. 15 is schematic top-down view of another example of a UAV comprising a plurality of protective covers.

FIG. 15 is schematic top-down view of another example of a UAV 1500 comprising a plurality of protective covers 1520. The UAV 1500 may comprise one or more properties as described herein. For example, the UAV 1500 may comprise a central body 1502. The lateral body 1502 may comprise a quadrilateral shape such that an arm 1502 extends outwardly from each of the four lateral surfaces of the central body 1502, and a set of rotor blades 1508 is coupled to each of the four arms 1502. The UAV 1500 may also comprise a protective cover 1520 for each of the four sets of rotor blades 1508. The UAV 1500 may comprise a plurality of sensors 1518 positioned on portions of the UAV 1500 outside of the keep-out zone 1510. For example, a sensor 1518 may be positioned on each of the protective covers 1520 outside of the rotor blades spin space 1512 of the corresponding set of rotor blades 1508, and the interference space 1514. In some embodiments, a rotor blades spin space 1512 can be the rotor disk of the corresponding set of rotor blades 1508. The interference space 1514 may comprise a lateral boundary comprising sides 1516 extending between adjacent sets of rotor blades 1508 of the UAV 1500. One or more of the sensors 1518 may be positioned on a portion of a protective cover 1520 facing away from the central body 1502, for example on a portion of a protective cover 1520 furthest and facing away from the central body. In some embodiments, one or more of the protective covers 1520 may be coupled to a corresponding arm 1506. In some embodiments, one or more of the protective covers 1520 may be coupled to the central body 1502. As shown in FIG. 15, a protective cover 1520 may completely surround a rotor disk of a corresponding set of rotor blades 1508. For example, each of the protective covers 1520 may be placed adjacent to or proximate to each of the rotor disks such that each of the protective covers 1520 completely surrounds the perimeter of each corresponding rotor disk. For example, the protective cover 1520 may have a ring shape. In some embodiments, the protective covers 1520 may be configured to provide protection for the UAV 1500. In some embodiments, the protective covers 1520 can be configured to provide protection from external impact for both the sets of rotor blades 1508 and the central body 1502.

In some embodiments, a protective cover 1520 may have a thickness and/or height configured to provide desired protection for the corresponding set of rotor blades 1508. In some embodiments, a protective cover 1520 may have a thickness and/or height configured to provide desired protection for the central body 1502. In some embodiments, as described herein, a height of at least a portion of a protective cover 1520 may be the same or greater than a height of a corresponding portion of a corresponding rotor disk.

In some embodiments, each of the protective covers 1520 may comprise a portion which extends over at least a portion of the central body 1502. In some embodiments, each of the protective covers 1520 of the UAV 1500 may comprise a portion which extends laterally beyond and away from the lateral periphery of the central body 1502. For example, each of the protective covers 1520 may comprise a portion which extends beyond the lateral periphery away from the central body 1502 along all four sides of the central body 1502, such that the protective covers 1520 are configured to provide protection for both the rotor blades 1508 and the central body 1502 from external impact. In some embodiments, portions of the protective covers 1520 may be positioned laterally beyond and away from the central body 1502 around or substantially around a lateral periphery of the central body. In some embodiments, a portion of each of the protective covers 1520 are positioned laterally further away from the central body 1502 than any portion of propulsion units, including the rotor blades 1508 and/or rotors of the propulsion units, and of the plurality of arms 1506.

In some embodiments, one or more protective covers may have various configurations for providing desired protection to one or more of a propulsion unit, including the rotors and/or rotor blades of the propulsion unit, a central body and an arm of the UAV. In some embodiments, a protective cover may partially surround a rotor disk of a corresponding set of rotor blades. In some embodiments, a protective cover may partially surround a rotor disk of a corresponding set of rotor blades. In some embodiments, one or more protective covers are configured to surround or substantially surround the central body, the plurality of arms, and the plurality of rotors of the UAV. In some embodiments, one or more protective covers of a UAV may be coupled to one or more of an arm and a central body of the UAV. In some embodiments, a protective cover may be coupled only to one or more arms of the UAV or only to the central body of the UAV. In some embodiments, a protective cover may be coupled to a distal end of an arm. In some embodiments, a protective cover may comprise at least a portion of which that is hollow such that wiring for communication between controllers of the UAV and one or more sensors positioned on the protective cover, such as electrical wiring, may be routed through at least a portion of the protective cover. For example, at least a portion of the wiring may be housed within the protective cover. In some embodiments, wiring for communication between one or more sensors on a protective cover may be completely or substantially completely housed within the protective cover and/or one or more other components of the UAV. In some embodiments, a protective cover may not be hollow. In some embodiments, wiring for communication between one or more sensors on the protective cover and one or more controllers in the central body of the UAV may be routed over, for example wrapped around, one or more external surfaces of the protective cover.

Figure 16:
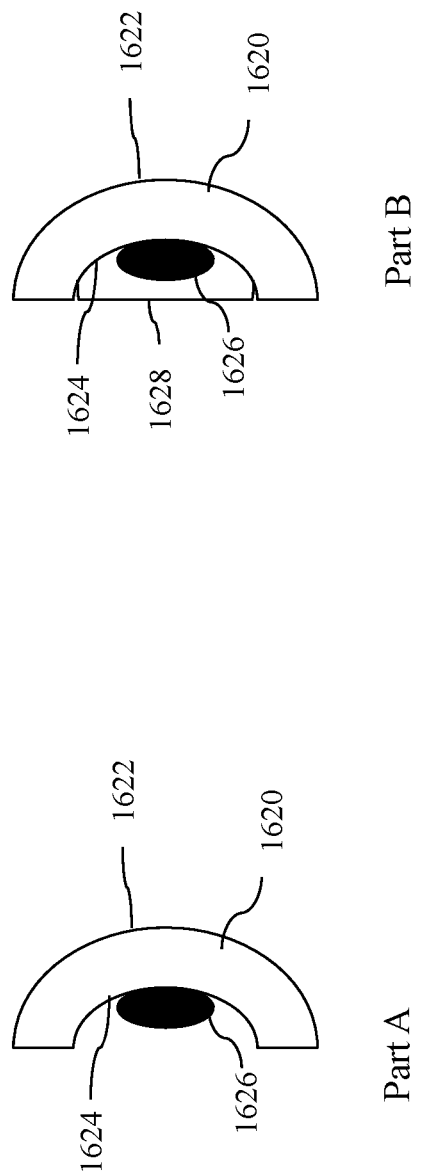
FIG. 16 shows schematic side cross-sectional views of examples of protective covers.

FIG. 16 shows schematic side cross-sectional views of an example of a protective cover 1620. One or more protective covers may comprise at least a portion having the schematic side cross-sectional view described with reference to FIG. 16, including for example, the protective covers described with reference to one or more of FIGS. 12-15. The protective cover 1620 may have a first surface 1622 facing a corresponding set of rotor blades and a second opposing surface 1624 facing away from the corresponding set of rotor blades. In some embodiments, the protective cover 1620 may comprise one or more features configured to provide physical protection for one or more sensors positioned on the protective cover 1620. Referring to Part A of FIG. 16, a sensor 1626 may extend from the second opposing surface 1624 of the protective cover 1620. In some embodiments, the second opposing surface 1624 may comprise a concave curvature to provide protection for the sensor 1626. For example, at least a portion of the sensor 1626 may be within the recess formed by the concavity. In some embodiments, the sensor 1626 may be positioned completely or substantially completely within the concavity on the second opposing surface 1624 of the protective cover 1620. Positioning a sensor within the concavity on the second opposing surface 1624 may provide structural support and/or protection for the sensor, for example reducing exposure of the sensor 1626 to external elements. Referring to Part B of FIG. 16, in some embodiments, the protective cover 1620 may comprise a protective shield 1628 over at least a portion of the second opposing surface 1624. For example, the protective shield 1628 may extend over at least a portion of the second opposing surface 1624 such that the protective shield 1628 extends over and encloses the sensor 1626. The protective shield 1628 may provide added physical protection for the sensor 1626 to further reduce or eliminate exposure of the external elements, such as impact with another object and/or environmental elements.

In some embodiments, one or more portions of the protective cover 1620 can be shaped to improve the ability of the sensor 1626 to measure one or more environmental parameters. In some embodiments, one or more portions of the protective cover 1620 can have a curvature to provide desired reflection of light, sound and/or radio waves transmitted by and/or received by the sensor 1626. In some embodiments, the protective cover 1620 can comprise a parabolic reflector to facilitate measurement of environmental parameters by the sensor 1626. At least a portion of the protective cover 1620 may be a parabolic reflector such that the ability of the sensor 1626 positioned on, adjacent to and/or extending from, the second opposing surface 1624 of the protective cover 1620 to measure one or more environmental parameters may be enhanced. In some embodiments, the second opposing surface 1624 can be shaped such that at least a portion of the second opposing surface 1624 forms a parabolic reflector. For example, the second surface 1624 may comprise a parabolic reflector to enhance the quality of measurements made by image, ultrasonic and/or GPS sensors.

Figure 17:
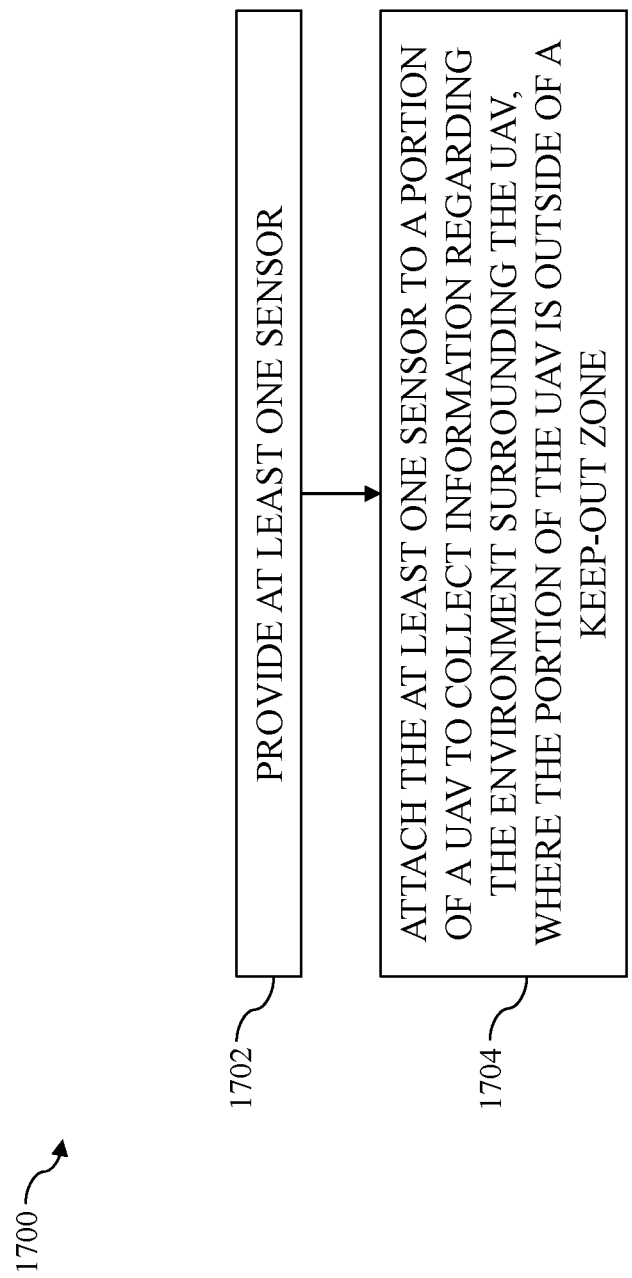
FIG. 17 is an example of a process flow diagram for assembling a UAV having one or more features described herein.

FIG. 17 is an example flow diagram of a process 1700 of assembling a UAV having one or more features described herein. In block 1702 at least one sensor is provided. As described herein, in some embodiments, the at least one sensor may comprise an image sensor, ultrasonic sensor and/or a GPS sensor. In block 1704, the at least one sensor may be attached to a portion of a UAV to collect information regarding the environment surrounding the UAV, where the portion of the UAV is outside of a keep-out zone. In some embodiments, the at least one sensor comprises one or more of an ultrasonic sensor, an image sensor and a GPS sensor. As described herein, a UAV comprising one or more sensors positioned outside of the keep-out zone can demonstrate improved obstacle avoidance capabilities, for example due to reduction or elimination of interference to the measurements made by the sensor from the UAV, thereby improving the quality of information collected by the sensors. Such a UAV may demonstrate improved ability to collect information regarding its surrounding environment.

Figure 18:
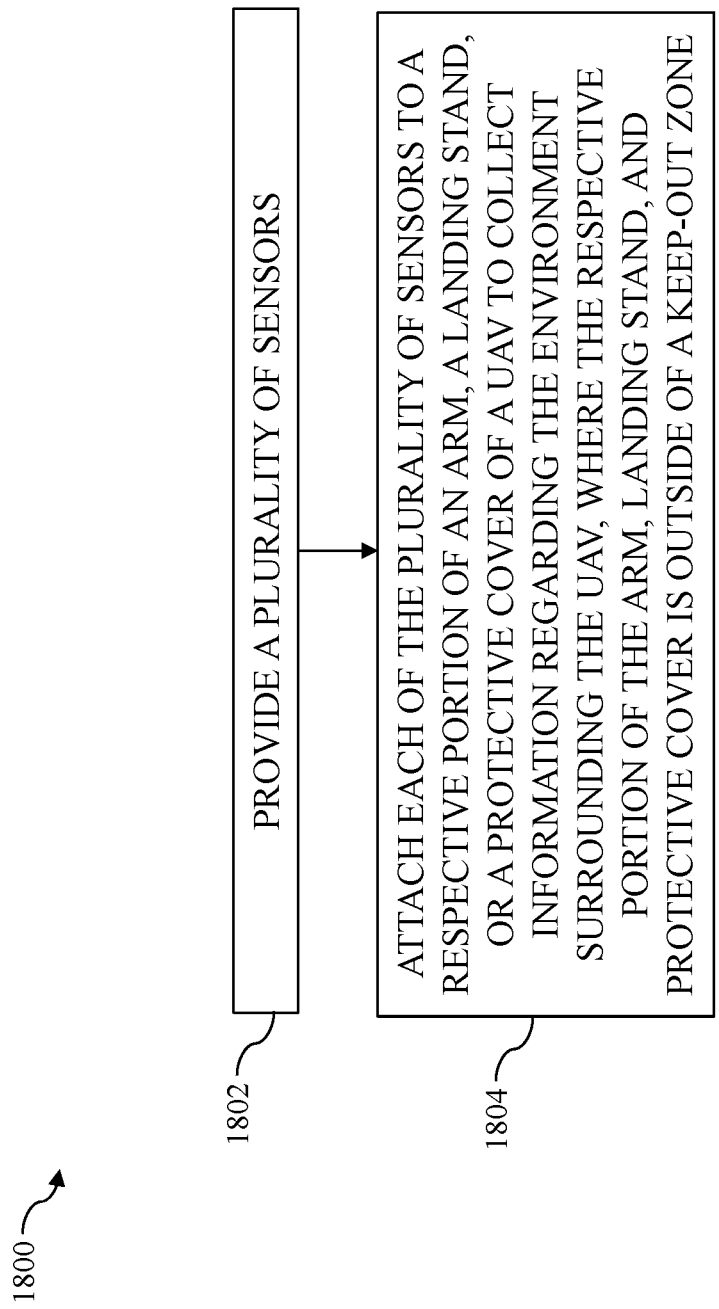
FIG. 18 is another example of a process flow diagram for assembling a UAV having one or more features described herein.

FIG. 18 is another example flow diagram of a process 1800 of assembling a UAV having one or more features described herein. In block 1802, a plurality of sensors can be provided. In block 1804, each of the plurality of sensors can be attached to a respective portion of an arm, a landing stand, or a protective cover of a UAV to collect information regarding the environment surrounding the UAV, where the respective portion of the arm, landing stand, and protective UAV is outside of a keep-out zone.

Figure 19:
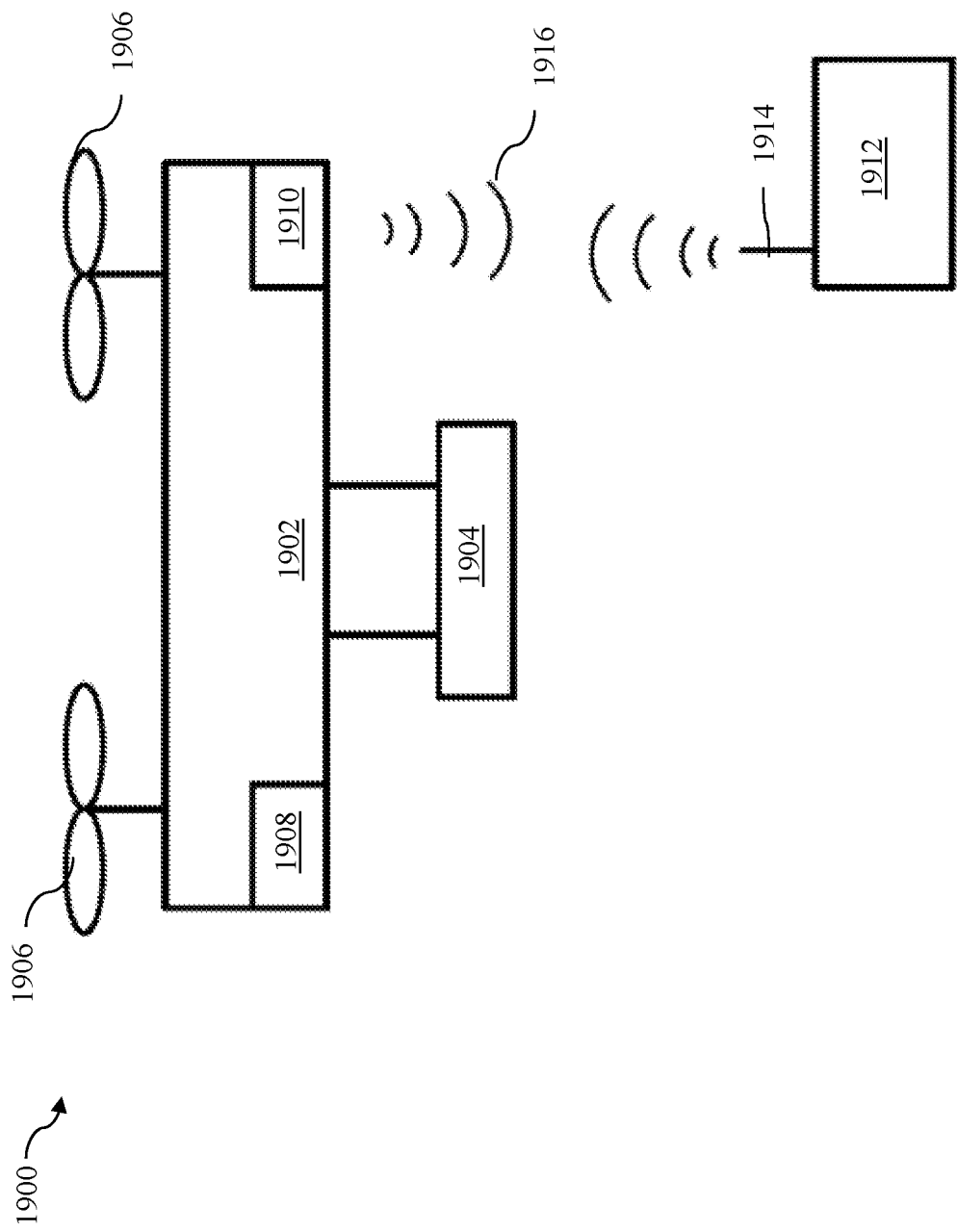
FIG. 19 is a schematic diagram of an example of a movable object including a carrier and a payload.

FIG. 19 illustrates a movable object 1900 including a carrier 1902 and a payload 1904, in accordance with embodiments. Although the movable object 1900 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., a UAV), including a UAV as described herein. In some instances, the payload 1904 may be provided on the movable object 1900 without requiring the carrier 1902. The movable object 1900 may include propulsion mechanisms 1906, a sensing system 1908, and a communication system 1910.

The propulsion mechanisms 1906 can include one or more of rotors, propellers, blades, engines, motors, wheels, axles, magnets, or nozzles, as previously described. For example, the propulsion mechanisms 1906 may be self-tightening rotors, rotor assemblies, or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1906 can be mounted on the movable object 1900 using any suitable means, such as a support element (e.g., a drive shaft) as described elsewhere herein. The propulsion mechanisms 1906 can be mounted on any suitable portion of the movable object 1900, such on the top, bottom, front, back, sides, or suitable combinations thereof.

In some embodiments, the propulsion mechanisms 1906 can enable the movable object 1900 to take off vertically from a surface or land vertically on a surface without requiring any horizontal movement of the movable object 1900 (e.g., without traveling down a runway). Optionally, the propulsion mechanisms 1906 can be operable to permit the movable object 1900 to hover in the air at a specified position and/or orientation. One or more of the propulsion mechanism 1900 may be controlled independently of the other propulsion mechanisms. Alternatively, the propulsion mechanisms 1900 can be configured to be controlled simultaneously. For example, the movable object 1900 can have multiple horizontally oriented rotors that can provide lift and/or thrust to the movable object. The multiple horizontally oriented rotors can be actuated to provide vertical takeoff, vertical landing, and hovering capabilities to the movable object 1900. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1900 (e.g., with respect to up to three degrees of translation and up to three degrees of rotation).

The sensing system 1908 can include one or more sensors that may sense the spatial disposition, velocity, and/or acceleration of the movable object 1900 (e.g., with respect to up to three degrees of translation and up to three degrees of rotation). The one or more sensors can include any of the sensors previously described herein, including GPS sensors, motion sensors, inertial sensors, proximity sensors, or image sensors. The sensing data provided by the sensing system 1908 can be used to control the spatial disposition, velocity, and/or orientation of the movable object 1900 (e.g., using a suitable processing unit and/or control module, as described below). Alternatively, the sensing system 1908 can be used to provide data regarding the environment surrounding the movable object, such as weather conditions, proximity to potential obstacles, location of geographical features, location of manmade structures, and the like.

The communication system 1910 enables communication with terminal 1912 having a communication system 1914 via wireless signals 1916. The communication systems 1910, 1914 may include any number of transmitters, receivers, and/or transceivers suitable for wireless communication. The communication may be one-way communication, such that data can be transmitted in only one direction. For example, one-way communication may involve only the movable object 1900 transmitting data to the terminal 1912, or vice-versa. The data may be transmitted from one or more transmitters of the communication system 1910 to one or more receivers of the communication system 1912, or vice-versa. Alternatively, the communication may be two-way communication, such that data can be transmitted in both directions between the movable object 1900 and the terminal 1912. The two-way communication can involve transmitting data from one or more transmitters of the communication system 1910 to one or more receivers of the communication system 1914, and vice-versa.

In some embodiments, the terminal 1912 can provide control data to one or more of the movable object 1900, carrier 1902, and payload 1904 and receive information from one or more of the movable object 1900, carrier 1902, and payload 1904 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1906), or a movement of the payload with respect to the movable object (e.g., via control of the carrier 1902). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1908 or of the payload 1904). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1912 can be configured to control a state of one or more of the movable object 1900, carrier 1902, or payload 1904. Alternatively or in combination, the carrier 1902 and payload 1904 can also each include a communication module configured to communicate with terminal 1912, such that the terminal can communicate with and control each of the movable object 1900, carrier 1902, and payload 1904 independently.

In some embodiments, the movable object 1900 can be configured to communicate with another remote device in addition to the terminal 1912, or instead of the terminal 1912. The terminal 1912 may also be configured to communicate with another remote device as well as the movable object 1900. For example, the movable object 1900 and/or terminal 1912 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1900, receive data from the movable object 1900, transmit data to the terminal 1912, and/or receive data from the terminal 1912. Optionally, the remote device can be connected to the Internet or other telecommunications network, such that data received from the movable object 1900 and/or terminal 1912 can be uploaded to a website or server.

Figure 20:
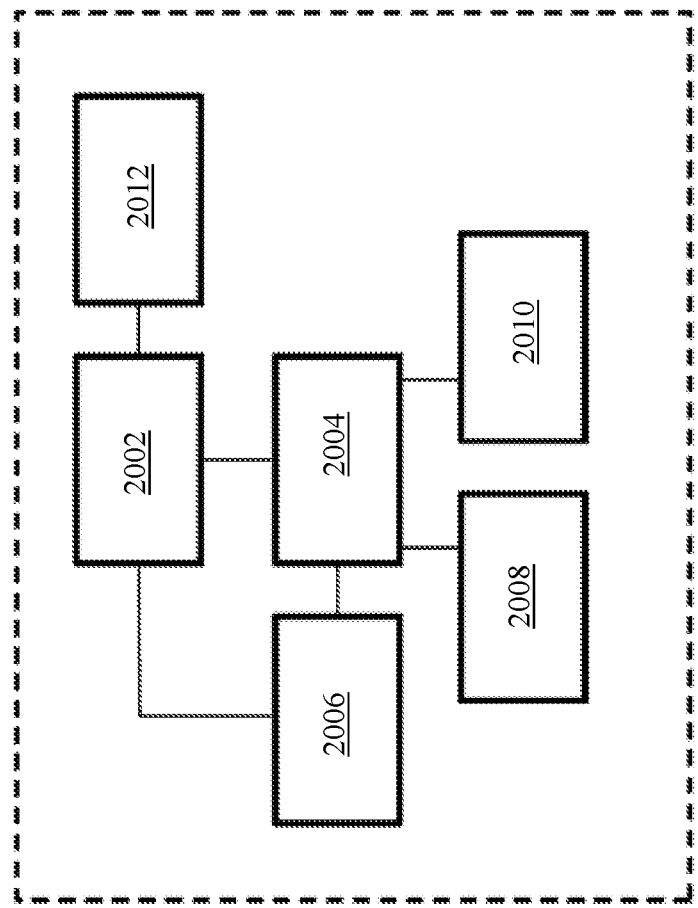
FIG. 20 is a schematic diagram of an example of a system for controlling a movable object.

FIG. 20 is a schematic illustration by way of block diagram of a system 2000 for controlling a movable object, in accordance with embodiments. A movable object may include a UAV as described herein. The system 2000 can be used in combination with any suitable embodiment of the systems, devices, and methods disclosed herein. The system 2000 can include a sensing module 2002, processing unit 2004, non-transitory computer readable medium 2006, control module 2008, and communication module 2010.

The sensing module 2002 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 2002 can be operatively coupled to a processing unit 2004 having a plurality of processors. In some embodiments, the sensing module can be operatively coupled to a transmission module 2012 (e.g., a Wi-Fi image transmission module) configured to directly transmit sensing data to a suitable external device or system. For example, the transmission module 2012 can be used to transmit images captured by a camera of the sensing module 2002 to a remote terminal.

The processing unit 2004 can have one or more processors, such as a programmable processor (e.g., a central processing unit (CPU)). The processing unit 2004 can be operatively coupled to a non-transitory computer readable medium 2006. The non-transitory computer readable medium 2006 can store logic, code, and/or program instructions executable by the processing unit 2004 for performing one or more steps. The non-transitory computer readable medium can include one or more memory units (e.g., removable media or external storage such as an SD card or random access memory (RAM)). In some embodiments, data from the sensing module 2002 can be directly conveyed to and stored within the memory units of the non-transitory computer readable medium 2006. The memory units of the non-transitory computer readable medium 2006 can store logic, code and/or program instructions executable by the processing unit 2004 to perform any suitable embodiment of the methods described herein. For example, the processing unit 2004 can be configured to execute instructions causing one or more processors of the processing unit 2004 to analyze sensing data produced by the sensing module. The memory units can store sensing data from the sensing module to be processed by the processing unit 2004. In some embodiments, the memory units of the non-transitory computer readable medium 2006 can be used to store the processing results produced by the processing unit 2004.

In some embodiments, the processing unit 2004 can be operatively coupled to a control module 2008 configured to control a state of the movable object. For example, the control module 2008 can be configured to control the propulsion mechanisms of the movable object to adjust the spatial disposition, velocity, and/or acceleration of the movable object with respect to six degrees of freedom. Alternatively or in combination, the control module 2008 can control one or more of a state of a carrier, payload, or sensing module.

The processing unit 2004 can be operatively coupled to a communication module 2010 configured to transmit and/or receive data from one or more external devices (e.g., a terminal, display device, or other remote controller). Any suitable means of communication can be used, such as wired communication or wireless communication. For example, the communication module 2010 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 2010 can transmit and/or receive one or more of sensing data from the sensing module 2002, processing results produced by the processing unit 2004, predetermined control data, user commands from a terminal or remote controller, and the like.

The components of the system 2000 can be arranged in any suitable configuration. For example, one or more of the components of the system 2000 can be located on the movable object, carrier, payload, terminal, sensing system, or an additional external device in communication with one or more of the above. Additionally, although FIG. 20 depicts a single processing unit 2004 and a single non-transitory computer readable medium 2006, one of skill in the art would appreciate that this is not intended to be limiting, and that the system 2000 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 2000 can occur at one or more of the aforementioned locations.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An unmanned aerial vehicle (UAV), comprising:
a central body;
a plurality of rotors, each rotor configured to be independently controllable by one or more controllers;
a plurality of arms extending from the central body, wherein each arm of the plurality of arms is configured to support one or more of the plurality of rotors;
a plurality of protective covers, at least one of the protective covers configured to protect at least one of the rotors;
a plurality of sensors, at least one of the plurality of sensors is configured to sense an environment in which the UAV is configured to operate, by detecting one or more obstacles within the environment; and
one or more landing stands connected to the central body, wherein at least one of the plurality of sensors is housed within the one or more landing stands,
wherein at least one of the plurality of sensors is located within a recess formed in one of the plurality of protective covers facing away from the central body, and wherein the UAV further comprises at least one shield disposed on at least one of the plurality of protective covers, the at least one shield extending over the at least one of the plurality of sensors located within the recess.

2. The UAV of claim 1, wherein the one or more landing stands extend in a direction perpendicular to a bottom surface of the central body.

3. The UAV of claim 1, where at least one of the plurality of sensors is located proximate to one of the plurality of arms.

4. The UAV of claim 1, wherein the one or more landing stands comprises:
a first landing stand comprising a hollow portion; and
a second landing stand comprising a hollow portion.

5. The UAV of claim 4, wherein a first sensor of the plurality of sensors is located within the hollow portion of the first landing stand.

6. The UAV of claim 4, wherein a second sensor of the plurality of sensors is located within the hollow portion of the second landing stand.

7. An unmanned aerial vehicle (UAV), comprising:
a central body;
a plurality of rotors;
a plurality of arms extending from the central body, wherein each arm of the plurality of arms is configured to support one or more of the plurality of rotors;
a plurality of protective covers, at least one of the protective covers configured to protect at least one of the rotors;
a plurality of sensors, at least one of the plurality of sensors located within a recess formed in one of the plurality of protective covers; and
at least one shield disposed on at least one of the protective covers, the at least one shield extending over the at least one sensor located within the recess.

8. The UAV of claim 7, wherein the recess formed in at least one of the plurality of protective covers has a shape that enhances the quality of measurements made by the plurality of sensors.

9. The UAV of claim 7, wherein the recess has a generally concave shape.

10. The UAV of claim 7, wherein the at least one shield is configured to enclose the at least one sensor within the recess.

11. The UAV of claim 7, wherein a cross-section of the central body has a substantially round shape.

12. The UAV of claim 11, wherein the plurality of arms extend from a curved surface of the central body.

13. An unmanned aerial vehicle (UAV), comprising:
a central body;
a plurality of rotors;
a plurality of arms extending from the central body, wherein each arm of the plurality of arms is configured to support one or more of the plurality of rotors;
a plurality of protective covers configured to protect at least one of the rotors;
a plurality of sensors, at least one of the plurality of sensors located within a recess formed in one of the plurality of protective covers; and
at least one shield disposed on at least one of the plurality of protective covers, the at least one shield extending over the at least one of the plurality of sensors located within the recess;
wherein at least one of the plurality of protective covers extends over a portion of the central body.

14. The UAV of claim 13, wherein at least one of the plurality of protective covers is configured to protect the central body and at least one of the rotors.

15. The UAV of claim 13, wherein at least one of the protective covers is configured to completely surround at least one of the rotors.

16. The UAV of claim 13, wherein at least one of the protective covers is coupled to at least one of the plurality of arms and the central body.

17. An unmanned aerial vehicle comprising:
a central body housing one or more controllers and attached with a plurality of protective covers;
a plurality of propulsion units surrounded and protected by the plurality of protective covers to prevent the plurality of propulsion units from external impact, wherein the plurality of the propulsion units are independently controllable by the one or more controllers, and wherein a first one of the plurality of the propulsion units spins in a clockwise direction and a second one of the plurality of the propulsion units spins in a counterclockwise direction;
wherein the plurality of protective covers include a plurality of arms that support the plurality of propulsion units,
a plurality of sensors configured to sense an environment around the unmanned aerial vehicle and disposed on an outer portion of the plurality of protective covers to reduce obstructions or interference by other components of the unmanned aerial vehicle;
wherein at least one of the plurality of sensors is located within a recess formed in one of the plurality of covers;
at least one shield disposed on at least one of the plurality of protective covers, the at least one shield extending over the at least one of the plurality of sensors located within the recess;
a landing stand coupled with the central body and being substantially perpendicular to the plurality of arms included in the plurality of protective covers.

18. The unmanned aerial vehicle according to claim 17, wherein the plurality of sensors are image sensors.

19. The unmanned aerial vehicle according to claim 18, further comprising an inertial sensor that is disposed within the central body.

20. The unmanned aerial vehicle according to claim 19, further comprising a barometer.

21. The unmanned aerial vehicle according to claim 18, wherein at least one of the image sensors is disposed in a recess within the plurality of the protective covers for protection.

22. The unmanned aerial vehicle according to claim 21, wherein the outer portion of the plurality of protective covers has a parabolic shape that enhances a quality of measurement by the image sensors.

23. The unmanned aerial vehicle according to claim 17, further comprising a second sensor housed within the landing stand such that the second sensor is protected from external impact.

24. The unmanned aerial vehicle according to claim 23, wherein the landing stand is disposed within a keep-out zone, wherein the keep-out zone includes areas that are swept by a rotor blade of the plurality of the propulsion units.

25. The unmanned aerial vehicle according to claim 17, wherein the plurality of arms have a hollow cavity configured to allow electrical wires to pass through.

26. The unmanned aerial vehicle according to claim 17, wherein the plurality of protective covers are arranged on opposite sides of the central body.

27. The unmanned aerial vehicle according to claim 18, wherein the image sensors are configured to provide data regarding location of geographical features and weather conditions.

28. The unmanned aerial vehicle according to claim 18, further comprising:
   a third sensor selected from the group consisting of a lidar sensor, an audio sensor, a field sensor, and a proximity sensor.

29. The unmanned aerial vehicle according to claim 17, wherein each protective cover extends beyond and overlaps with a lateral periphery of the central body for protecting the central body.

* * * * *